(12) United States Patent
Hino et al.

(10) Patent No.: US 11,307,509 B2
(45) Date of Patent: Apr. 19, 2022

(54) ELECTRO-CONDUCTIVE MEMBER, METHOD FOR PRODUCING SAME, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Tetsuo Hino, Yamato (JP); Yasuhiro Fushimoto, Kamakura (JP); Norifumi Muranaka, Yokohama (JP); Masafumi Kyogaku, Yokohama (JP); Masaki Yamada, Numazu (JP); Hiroshi Inoue, Fujisawa (JP); Takumi Furukawa, Susono (JP); Hiroaki Watanabe, Odawara (JP); Kenya Terada, Suntou-gun (JP); Yuya Tomomizu, Ichikawa (JP); Toshimitsu Nakazawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 17/070,995

(22) Filed: Oct. 15, 2020

(65) Prior Publication Data
US 2021/0048759 A1 Feb. 18, 2021

Related U.S. Application Data

(63) Continuation of application No. PCT/JP2019/016347, filed on Apr. 16, 2019.

(30) Foreign Application Priority Data

Apr. 18, 2018 (JP) .............................. JP2018-079952
Feb. 26, 2019 (JP) .............................. JP2019-032936
Mar. 29, 2019 (JP) .............................. JP2019-069095

(51) Int. Cl.
*G03G 5/05* (2006.01)
*G03G 5/028* (2006.01)
*G03G 21/18* (2006.01)
*G03G 15/08* (2006.01)
(Continued)

(52) U.S. Cl.
CPC ........... *G03G 5/0553* (2013.01); *G03G 5/028* (2013.01); *G03G 15/0233* (2013.01);
(Continued)

(58) Field of Classification Search
CPC .. G03G 5/0553; G03G 5/028; G03G 21/1814; G03G 15/0233; G03G 15/0818; G03G 15/1685; G03G 15/0812
See application file for complete search history.

(56) References Cited

U.S. PATENT DOCUMENTS 5,198,685 A 3/1993 Kitani et al.
6,697,587 B2 2/2004 Harada
(Continued)

FOREIGN PATENT DOCUMENTS

CN 101573666 A 11/2009
CN 102203682 A 9/2011
(Continued)

OTHER PUBLICATIONS

International Search Report and Written Opinion issued in corresponding parent International Application No. PCT/JP2019/016347, dated Jul. 9, 2019.
(Continued)

*Primary Examiner* — Sandra Brase
(74) *Attorney, Agent, or Firm* — Venable LLP

(57) ABSTRACT

An electro-conductive layer of an electrophotographic electro-conductive member has a matrix-domain structure. The matrix contains a first rubber. The domain contains a second rubber and electro-conductive particles. Where μ represents an average of ratios of the cross-sectional area of the
(Continued)

electro-conductive particles contained in each of the domains to the cross-sectional area of each of the domains appearing on a cross-section of the electro-conductive layer in a thickness direction, and σ represents a standard deviation of the ratios, σ/μ is 0 or more and 0.4 or less, and μ is 20% or more and 40% or less. At least eight of samples with a first cubic shape 9 μm on a side, which are sampled at arbitrary nine positions on the electro-conductive layer, satisfy the specified condition.

8 Claims, 6 Drawing Sheets

(51) Int. Cl.
G03G 15/16 (2006.01)
G03G 15/02 (2006.01)

(52) U.S. Cl.
CPC ..... *G03G 15/0812* (2013.01); *G03G 15/0818* (2013.01); *G03G 15/1685* (2013.01); *G03G 21/1814* (2013.01)

(56) References Cited

U.S. PATENT DOCUMENTS

| | | | |
|---|---|---|---|
| 7,693,457 B2 | 4/2010 | Kuruma et al. |
| 7,797,833 B2 | 9/2010 | Nakamura et al. |
| 7,799,398 B2 | 9/2010 | Nakamura et al. |
| 7,835,669 B2 | 11/2010 | Furukawa |
| 7,962,068 B2 | 6/2011 | Kuroda et al. |
| 8,163,389 B2 | 4/2012 | Hirakawa |
| 8,298,670 B2 | 10/2012 | Muranaka et al. |
| 8,426,090 B2 | 4/2013 | Sakka |
| 8,440,307 B2 | 5/2013 | Nose et al. |
| 8,445,113 B2 | 5/2013 | Furukawa et al. |
| 8,449,975 B2 | 5/2013 | Hirakoso et al. |
| 8,469,867 B2 | 6/2013 | Kuroda et al. |
| 8,481,167 B2 | 7/2013 | Watanabe et al. |
| 8,491,994 B2 | 7/2013 | Harada et al. |
| 8,501,312 B2 | 8/2013 | Watanabe et al. |
| 8,501,325 B2 | 8/2013 | Tomomizu et al. |
| 8,503,911 B2 | 8/2013 | Suzumura et al. |
| 8,526,857 B2 | 9/2013 | Tomomizu et al. |
| 8,532,535 B2 | 9/2013 | Nose et al. |
| 8,538,298 B2 | 9/2013 | Harada et al. |
| 8,600,273 B2 | 12/2013 | Yamada et al. |
| 8,622,881 B1 | 1/2014 | Harada et al. |
| 8,628,854 B2 | 1/2014 | Yamauchi et al. |
| 8,655,222 B2 | 2/2014 | Nakamura et al. |
| 8,668,987 B2 | 3/2014 | Yamauchi et al. |
| 8,685,601 B2 | 4/2014 | Nose et al. |
| 8,706,011 B2 | 4/2014 | Anan et al. |
| 8,715,830 B2 | 5/2014 | Yamada et al. |
| 8,741,523 B2 | 6/2014 | Hori |
| 8,750,762 B2 | 6/2014 | Harada et al. |
| 8,755,714 B2 | 6/2014 | Nagamine et al. |
| 8,768,226 B2 | 7/2014 | Koyanagi et al. |
| 8,768,227 B2 | 7/2014 | Urushihara et al. |
| 8,771,818 B2 | 7/2014 | Nishioka et al. |
| 8,774,677 B2 | 7/2014 | Sakurai et al. |
| 8,798,508 B2 | 8/2014 | Yamada et al. |
| 8,837,985 B2 | 9/2014 | Ishida et al. |
| 8,846,287 B2 | 9/2014 | Yamada et al. |
| 8,852,743 B2 | 10/2014 | Kikuchi et al. |
| 8,874,007 B2 | 10/2014 | Kawamura et al. |
| 8,874,012 B2 | 10/2014 | Yamada et al. |
| 8,913,930 B2 | 12/2014 | Ishii et al. |
| 8,923,732 B2 | 12/2014 | Harada et al. |
| 8,991,053 B2 | 3/2015 | Watanabe et al. |
| 9,023,465 B2 | 5/2015 | Yamada et al. |
| 9,086,643 B2 | 7/2015 | Kikuchi et al. |
| 9,128,403 B2 | 9/2015 | Yamauchi et al. |
| 9,146,482 B2 | 9/2015 | Watanabe et al. |
| 9,360,833 B2 | 6/2016 | Terada et al. |
| 9,372,428 B2 | 6/2016 | Kuroda et al. |
| 9,372,429 B2 | 6/2016 | Watanabe et al. |
| 9,541,854 B2 | 1/2017 | Kikuchi et al. |
| 9,547,250 B2 | 1/2017 | Kikuchi et al. |
| 9,551,949 B2 | 1/2017 | Yamauchi et al. |
| 9,581,931 B2 | 2/2017 | Yamada et al. |
| 9,599,913 B2 | 3/2017 | Nishioka et al. |
| 9,639,009 B2 | 5/2017 | Yamaguchi et al. |
| 9,651,888 B2 | 5/2017 | Muranaka et al. |
| 9,665,028 B2 | 5/2017 | Arimura et al. |
| 9,665,029 B2 | 5/2017 | Hino et al. |
| 9,811,009 B2 | 11/2017 | Yamada et al. |
| 9,811,021 B2 | 11/2017 | Muranaka et al. |
| 9,904,199 B2 | 2/2018 | Terada et al. |
| 9,910,379 B2 | 3/2018 | Furukawa et al. |
| 9,958,802 B2 | 5/2018 | Kikuchi et al. |
| 9,964,914 B2 | 5/2018 | Arimura et al. |
| 9,977,353 B2 | 5/2018 | Nishioka et al. |
| 9,977,359 B2 | 5/2018 | Koyanagi et al. |
| 10,012,924 B2 | 7/2018 | Yoshidome et al. |
| 10,018,927 B2 | 7/2018 | Yamada et al. |
| 10,018,934 B2 | 7/2018 | Yamada et al. |
| 10,108,129 B2 | 10/2018 | Yamaguchi et al. |
| 10,146,149 B2 | 12/2018 | Watanabe et al. |
| 10,197,930 B2 | 2/2019 | Yamada et al. |
| 10,303,079 B2 | 5/2019 | Utsuno et al. |
| 10,317,811 B2 | 6/2019 | Tomomizu et al. |
| 10,331,054 B2 | 6/2019 | Urushihara et al. |
| 10,379,460 B2 | 8/2019 | Arimura et al. |
| 10,416,588 B2 | 9/2019 | Masu et al. |
| 10,545,453 B2 | 1/2020 | Iwasaki et al. |
| 10,558,136 B2 | 2/2020 | Furukawa et al. |
| 10,649,350 B2 | 5/2020 | Yamaguchi et al. |
| 10,663,913 B2 | 5/2020 | Yamaai et al. |
| 2006/0142131 A1 | 6/2006 | Iwamura |
| 2006/0226572 A1 | 10/2006 | Tanaka et al. |
| 2011/0013939 A1 | 1/2011 | Ono |
| 2012/0076535 A1 | 3/2012 | Nagamine et al. |
| 2012/0237863 A1 | 9/2012 | Wu |
| 2012/0308261 A1 | 12/2012 | Tsuru et al. |
| 2013/0004206 A1 | 1/2013 | Kuroda et al. |
| 2013/0034369 A1 | 2/2013 | Masu et al. |
| 2013/0064571 A1 | 3/2013 | Kodama et al. |
| 2014/0219679 A1 | 8/2014 | Liu et al. |
| 2015/0087489 A1* | 3/2015 | Sato ............. G03G 15/0233 399/176 |
| 2015/0331346 A1 | 11/2015 | Yamauchi et al. |
| 2017/0102633 A1* | 4/2017 | Yoshidome ........ G03G 21/1814 |
| 2019/0094741 A1 | 3/2019 | Uno et al. |
| 2019/0302644 A1 | 10/2019 | Yamada et al. |
| 2020/0033742 A1 | 1/2020 | Komatsu et al. |
| 2020/0041920 A1 | 2/2020 | Arimura et al. |
| 2020/0310265 A1 | 10/2020 | Nishioka et al. |
| 2020/0310266 A1 | 10/2020 | Kikuchi et al. |
| 2021/0026295 A1 | 1/2021 | Yamada et al. |
| 2021/0033996 A1 | 2/2021 | Kikuchi et al. |
| 2021/0041796 A1 | 2/2021 | Nishioka et al. |

FOREIGN PATENT DOCUMENTS

| | | |
|---|---|---|
| CN | 102221794 A | 10/2011 |
| EP | 3048489 A1 | 7/2016 |
| EP | 3073324 A1 | 9/2016 |
| JP | 2002003651 A | 1/2002 |
| JP | 2005-321764 A | 11/2005 |
| JP | 2006-30456 A | 2/2006 |
| JP | 2008-292573 A | 12/2008 |
| JP | 2012163954 A | 8/2012 |
| JP | 2013020175 A | 1/2013 |
| JP | 2016-18154 A | 2/2016 |
| JP | 2017072833 A | 4/2017 |

OTHER PUBLICATIONS

Matsutani et al., "Numerical Computations of Conductivity in Continuum Percolation for Overlapping Spheroids", International Journal of Modern Physics C vol. 21, No. 6 (2010), pp. 709-729, World Scientific Publishing Company.

(56) References Cited

OTHER PUBLICATIONS

Molding vol. 23, No. 2, pp. 72-77, (2011).
Bando Technical Report No. 18/2014, pp. 2-7.

* cited by examiner

ELECTRO-CONDUCTIVE MEMBER, METHOD FOR PRODUCING SAME, PROCESS CARTRIDGE AND ELECTROPHOTOGRAPHIC IMAGE FORMING APPARATUS

CROSS-REFERENCE TO RELATED APPLICATIONS

This application is a Continuation of International Patent Application No. PCT/JP2019/016347, filed Apr. 16, 2019, which claims the benefit of Japanese Patent Application No. 2018-079952, filed Apr. 18, 2018, Japanese Patent Application No. 2019-032936, filed Feb. 26, 2019, and Japanese Patent Application No. 2019-069095, filed Mar. 29, 2019, all of which are hereby incorporated by reference herein in their entirety.

BACKGROUND

The present disclosure relates to an electrophotographic electro-conductive member, a method for producing the electro-conductive member, a process cartridge and an electrophotographic image forming apparatus.

Description of the Related Art

In electrophotographic image forming apparatuses that are image forming apparatuses in which an electrophotographic system is employed, electro-conductive members are used for various purposes: as electro-conductive rollers and blades such as charging rollers, transfer rollers, developing rollers and development blades. These electro-conductive members include an electro-conductive layer containing electro-conductive particles of carbon black (CB) etc. for adjusting conductivity.

Japanese Patent Application Laid-Open No. 2002-003651 discloses a semielectro-conductive rubber composition having a sea-island structure including a polymer continuous phase formed of an ion-conductive rubber material, and a polymer particle phase formed of an electron-electro-conductive rubber material, the ion-conductive rubber material being mainly formed of raw material rubber having a volume-specific resistivity of $1 \times 10^{12}$ Ω·cm or less, the electron-electro-conductive rubber material being made electro-conductive by adding an electron-conductive agent (electro-conductive particles) to raw material rubber B. Japanese Patent Application Laid-Open No. 2002-003651 also discloses a charging member including an elastic layer formed from the semi electro-conductive rubber composition. Japanese Patent Application Laid-Open No. 2002-003651 reveals that such a semi electro-conductive rubber composition advantageously has small voltage dependency of electric resistance, small variation in electric resistance, and small environmental dependency of electric resistance.

The present inventors have considered setting a charging bias, which is applied between the charging member of Japanese Patent Application Laid-Open No. 2002-003651 and an electrophotographic photoreceptor as a body to be charged, to a voltage (−800 V to −1000 V) lower than a common charging bias (e.g. about −1100 V) in formation of an electrophotographic image using the charging member. This is because in response to the demand for further reduction in size and cost of electrophotographic image forming apparatuses in recent years, the size of a power source can be made smaller if electrophotographic images of high quality can be obtained even when the charging voltage is reduced.

As a result, graininess in a halftone image may appear in an electrophotographic image because an electrophotographic photoreceptor has a non-uniform surface potential.

Even when the charging bias is reduced, it is desirable to provide an electrophotographic electro-conductive member usable as a charging member capable of uniformly charging a body to be charged.

One aspect of the present disclosure is directed to providing an electrophotographic electro-conductive member to be used in application of a low voltage, with which transfer of charge in an electro-conductive path is made extremely efficient, the electric resistivity is made less likely to change even in a high-speed process, and the electro-conductive path is made homogeneous to achieve suppression of discharge unevenness.

Another aspect of the present disclosure is directed to providing a process cartridge which contributes to formation of an electrophotographic image of high quality. Still another aspect of the present disclosure is directed to providing an electrophotographic image forming apparatus capable of forming an electrophotographic image of high quality.

SUMMARY

According to one aspect of the present disclosure, there is provided an electrophotographic electro-conductive member comprising an electro-conductive layer containing: a matrix containing a crosslinked product of a first rubber; and domains dispersed in the matrix, each of the domains containing a crosslinked product of a second rubber and electro-conductive particles, the first rubber being different from the second rubber, wherein when an average of ratios of the cross-sectional area of the electro-conductive particles contained in each of the domains to the cross-sectional area of each of the domains appearing on a cross-section of the electro-conductive layer in a thickness direction is defined as $\mu$, and a standard deviation of the ratios is defined as $\sigma$, $\sigma/\mu$ is 0 or more and 0.4 or less, $\mu$ is 20% or more and 40% or less, and wherein among first cubic shaped samples each having 9 μm on a side sampled at arbitrary nine portions from the electro-conductive layer, at least eight of the samples satisfy the following condition (1).

The condition (1) is that "assuming that one sample is divided into 27 unit cubes having 3 μm on a side, and a volume Vd of the domains contained in each of the unit cubes is calculated, a number of the unit cubes having Vd of 2.7 to 10.8 μm³ is at least 20".

According to another aspect of the present disclosure, there is provided a method for producing the electrophotographic electro-conductive member, comprising the step of forming the electro-conductive layer from a rubber mixture using a kneader having an elongational shear screw, the rubber mixture including a first rubber composition containing the first rubber and a second rubber composition containing the second rubber.

According to still another aspect of the present disclosure, there is provided a process cartridge which is detachably attached to the main body of an electrophotographic image forming apparatus, the process cartridge comprising the electro-conductive member.

According to still another aspect of the present disclosure, there is provided an electrophotographic image forming apparatus comprising the electro-conductive member.

Further features of the present disclosure will become apparent from the following description of exemplary embodiments with reference to the attached drawings.

DESCRIPTION OF THE EMBODIMENTS

Figure 1A:
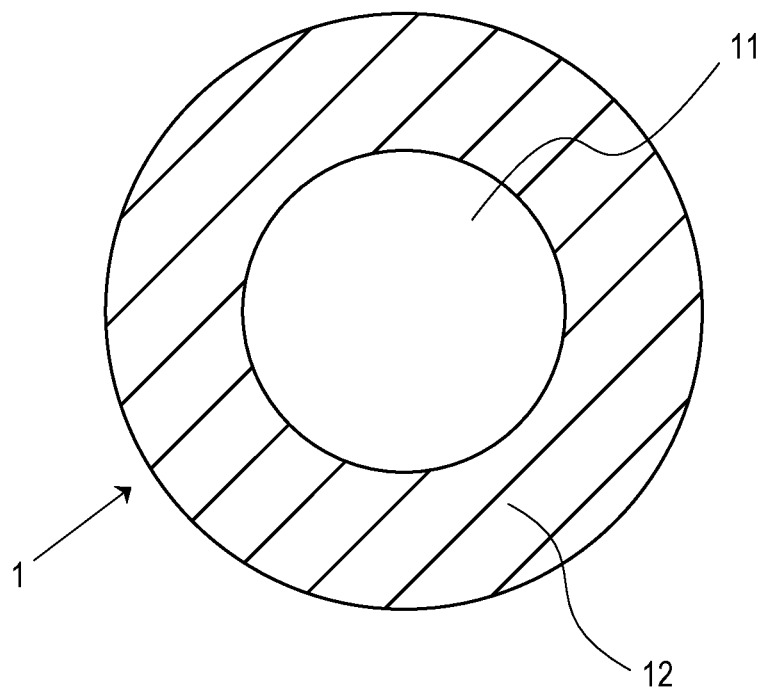
FIG. 1A shows an example of an electrophotographic electro-conductive member according to one aspect of the present disclosure.

The present inventors have examined the reason why it is difficult for the charging member of Japanese Patent Application Laid-Open No. 2002-003651 to uniformly charge a surface of an electrophotographic photoreceptor when the charging bias is reduced. In the process of the examination, attention has been given to the role of a polymer particle phase formed of an electron-electro-conductive rubber material in the charging member of Japanese Patent Application Laid-Open No. 2002-003651. That is, it is considered that in an elastic layer (electro-conductive layer), electron-conductivity is imparted to the electro-conductive layer through transfer of electrons between polymer particle phases. On the basis of the consideration, it is presumed that the above-described problem associated with reduction of the charging bias is ascribable to nonuniformity of the dispersed state of polymer particle phases in the electro-conductive layer. That is, reduction of the charging bias makes it difficult to cause transfer of electrons between polymer particle phases. Here, give attention to one polymer particle phase. When the charging bias is high, electrons from the polymer particle phase may be almost equally transferred to a plurality of other polymer particle phases present around the polymer particle phase even if there is variation in the distance from other polymer particle phases. However, when the charging bias is low, electrons from the polymer particle phase may be transferred preferentially to polymer particle phases closest to the polymer particle phase, among other polymer particle phases present around the polymer particle phase. As a result, unevenness occurs in flow of electrons in the electro-conductive layer, so that discharge to the electrophotographic photoreceptor from the outer surface of the charging member becomes non-uniform. This may cause the photoelectric photoreceptor to have a non-uniform surface potential.

Thus, the present inventors have considered that suppression of variation in the distance between polymer particle phases in the electro-conductive layer can solve the above-described problem associated with reduction of the charging bias. On the basis of the consideration, the present inventors have further conducted studies, and resultantly found that an electro-conductive member satisfying the following requirements (A) and (B) is effective for solving the problem.

Granular images in halftone images, which result from nonuniformity of the surface potential of the electrophotographic photoreceptor, may be generated as a result of occurrence of unevenness in discharge uniformity due to unevenness of conductivity uniformity in the electro-conductive member (electro-conductive points are not uniformly dispersed). Graininess in the halftone image in durability evaluation is reduced with an increase in electric resistance value of a charging roller.

Requirement (A)

Having an electro-conductive layer, the electro-conductive layer having: a matrix containing a crosslinked product of a first rubber; and a plurality of domains dispersed in the matrix, and each of the domains contains a crosslinked product of a second rubber different from the first rubber, and electro-conductive particles.

Requirement (B)

$\sigma/\mu$ is 0 or more and 0.4 or less, where $\mu$ represents an average of ratios of the cross-sectional area of the electro-conductive particles contained in each of the domains to the cross-sectional area of each of the domains appearing on a cross-section of the electro-conductive layer in a thickness direction, and $\sigma$ represents a standard deviation of the ratios, $\mu$ is 20% or more and 40% or less, and at least eight of samples with a first cubic shape 9 μm on a side, which are sampled at arbitrary nine positions on the electro-conductive layer, meet the following condition (1):

Condition (1)

assuming that one sample is divided into 27 unit cubes having 3 μm on a side, and a volume Vd of the domains contained in each of the unit cubes is calculated, a number of the unit cubes having Vd of 2.7 to 10.8 μm³ is at least 20.

That is, when the relationship between $\mu$ and $\sigma$ meets the requirement "$\sigma/\mu$ is 0 or more and 0.4 or less", variation in the number/amount of electro-conductive particles contained in the domains is small, and as a result, the domains are uniform in electric resistance. In particular, it is particularly preferable that the relationship between $\mu$ and $\sigma$ meet the requirement "$\sigma/\mu$ is 0 or more and 0.25 or less" because the domains are further uniform in electric resistance, so that the effects of the present disclosure tend to be further enhanced.

For making the $\sigma/\mu$ value low, it is preferable to increase the number/amount of electro-conductive particles contained in the domains, and it is also preferable to equalize the sizes of the domains.

Here, $\mu$ is 20% or more and 40% or less. When $\mu$ is 20% or more, electrical connection between electro-conductive particles in the domain is stabilized. When $\mu$ is 40% or less, the domain can be inhibited from being changed in shape by electro-conductive particles due to an excessive increase in the amount of electro-conductive particles in the domain. $\mu$ is more preferably 23% or more and 40% or less, particularly preferably 28% or more and 40% or less.

The unit cubes 3 μm on a side each contain domains in an amount of 10 to 40 vol %, and the cubes are homogeneously present in the entire electro-conductive layer. As a result, the electro-conductive domains are three-dimensionally equally and densely arranged in the electro-conductive layer. As described later, the ratio of domains homogeneously present in the entire electro-conductive layer tends to increase even when the total volume of domains is increased. When the domain size is reduced to increase the number of domains while the total volume of the domains is unchanged, the ratio of domains homogeneously present in the entire electro-conductive layer tends to dramatically increase.

That is, the effect of this aspect can be enhanced with an increase in the number of unit cubes 3 μm on a side which meet the Vd value of the condition (1). Thus, the number of unit cubes is 20 or more, preferably 22 or more, more preferably 25 or more.

Since an electro-conductive path is formed so as to continue from an electro-conductive support to the surface of the electro-conductive layer, domains are three-dimensionally arranged. The term "the electro-conductive path continues" refers to a state in which charge is transferred between domains upon application of a desired voltage. Depending on the applied voltage, the thickness of the electro-conductive layer, and the electric resistances of the domain and the matrix, for example, the distance between adjacent wall surfaces of the domains, when evaluated three-dimensionally, is preferably 100 nm or less, and particularly preferably 50 nm or less from the viewpoint of transfer of charge.

That is, as a result of forming an electro-conductive layer structure meeting the above-described relationship, transfer of charge in the electro-conductive path can be extremely efficiently performed even when the charging bias is reduced. As a result, the electric resistivity is less likely to change even in a high-speed process, and the electro-conductive path is made homogeneous to achieve suppression of charge unevenness and discharge unevenness, so that electrophotographic images of high quality can be stably formed.

The present disclosure will be described in detail below. The electrophotographic electro-conductive member will be described as a charging roller which is a typical example of the electro-conductive member, but the use of the electro-conductive member of the present disclosure is not limited. A charging roller, a transfer roller, a developing roller and a development blade as embodiments in the present disclosure can be prepared by appropriately adjusting the shape of the electro-conductive member of the present disclosure, and carrying out known conventional methods for preparation of the respective members. That is, with the electro-conductive member to be used in application of a low voltage, transfer of charge in an electro-conductive path is made extremely efficient, the electric resistivity is made less likely to change even in a high-speed process, and the electro-conductive path is made homogeneous to achieve suppression of discharge unevenness, as in the case of reducing the charging bias.

<Electro-Conductive Member>

Figure 1B:
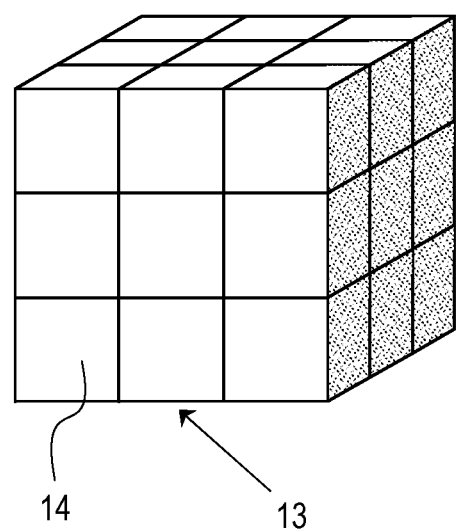
FIG. 1B is a schematic diagram illustrating a first cube and a unit cube according to one aspect of the present disclosure.

FIG. 1A shows an example of an electrophotographic electro-conductive member according to one aspect of the present disclosure, and FIG. 1B is a schematic diagram illustrating a first cube and a unit cube according to one aspect of the present disclosure. As is apparent from a cross-section shown in FIG. 1A, an electrophotographic electro-conductive member 1 according to this aspect includes an electro-conductive layer 12 on an electro-conductive substrate (electro-conductive shaft core) 11, the electro-conductive layer 12 having a matrix containing a crosslinked product of a first rubber and a plurality of domains dispersed in the matrix. Other layers can be further provided on the electro-conductive layer if necessary.

Preferably, the electric resistance of the electro-conductive member is controlled to $10^4$ to $10^8$ Ωcm in terms of a volume resistivity. When the volume resistivity is $10^4$ Ωcm or more, a good current braking property is exhibited, and generation of an adverse effect on images can be suppressed. On the other hand, when the volume resistivity is $10^8$ Ωcm or less, it is possible to feed a current sufficient for the electro-conductive member to function.

<Electro-Conductive Substrate>

From electro-conductive substrates known in the field of electrophotographic electro-conductive members, an appropriate electro-conductive substrate can be selected and used. For example, the electro-conductive shaft core is a columnar carbon steel alloy whose surface is plated with nickel to a thickness of about 5 μm. The substrate may have a hollow cylindrical shape. The substrate may be coated with an electro-conductive adhesive (pressure sensitive adhesive).

<Electro-Conductive Layer>

The electro-conductive layer has a matrix containing a crosslinked product of a first rubber and a plurality of domains dispersed in the matrix. Where μ represents an average of ratios of the cross-sectional area of the electro-conductive particles contained in each of the domains to the cross-sectional area of each of the domains appearing on a cross-section of the electro-conductive layer in a thickness direction, and σ represents a standard deviation of the ratios, the following relationship is met: "σ/μ is 0 or more and 0.4 or less and μ is 20% or more and 40% or less". At the same time, at least eight of samples (13) with a first cubic shape 9 μm on a side, which are sampled at arbitrary nine positions on the electro-conductive layer, meet the following condition (1):

"Condition (1): assuming that one sample is divided into 27 unit cubes having 3 μm on a side, and a volume Vd of the domains contained in each of the unit cubes is calculated, a number of the unit cubes having Vd of 2.7 to 10.8 μm$^3$ is at least 20".

When the electro-conductive member is used as a charging roller, it is preferable that the electro-conductive layer of the electro-conductive member have uniform semiconductivity for uniformly charging a body to be charged, and have a low hardness (for example, the elastic modulus of the electro-conductive layer is 1 MPa or more and 100 MPa or less) for securing uniform contact with a photoreceptor as a body to be charged.

Preferably, substantially only domains are made electro-conductive by electro-conductive particles, and the electro-conductive particles are unevenly distributed in the domains.

[Matrix]

(Material of First Rubber)

The electro-conductive layer has a matrix containing a crosslinked product of a first rubber. The first rubber is not particularly limited as long as it can form a matrix containing the first rubber when blended at a predetermined ratio with second rubber as described later, and a rubber composition known in the field of electrophotographic electro-conductive members can be suitably used depending on desired physical properties. Examples thereof include natural rubber, vulcanized products thereof, and synthetic rubber. Examples of the synthetic rubber include styrene-butadiene rubber (SBR), acrylonitrile-butadiene rubber (NBR), butadiene rubber (BR), epichlorohydrin rubber, silicone rubber, fluororubber, isoprene rubber, chloroprene rubber and ethylene-propylene rubber. Modified rubber and copolymers thereof, and hydrogenated products thereof may be used, and of course, these rubbers may be appropriately combined, and used.

Fillers, softeners, processing aids, tackifiers, anti-adhesive agents, dispersants, foaming agents, electro-conductive aids, roughening particles and the like which are commonly used as rubber compounding agents can be added to the rubber as long as the effects of the present disclosure are not impaired. It is needless to say that volcanizing agents, vulcanization aids and vulcanization accelerators can be added.

The content of the rubber compounding agent blended in the matrix depends on raw material rubber selected, and is preferably 0.1 parts by mass or more and 100 parts by mass or less based on 100 parts by mass of the first rubber.

It has been experimentally confirmed that diene-based rubber containing a double bond on the main chain has itself a good property against current passage, i.e. resistance to degradation in a test on rubber degradation by current passage.

Thus, the synthetic rubber used is preferably SBR, NBR or BR which is diene-based rubber, or modified rubber thereof. Since NBR and SBR have been confirmed to suffer from less thermal degradation during kneading, the rubber used is particularly preferably NBR or SBR. SBR tends to improve in processability and abradability, and may be extremely preferable depending on desired physical properties.

(Electric Resistance of Matrix)

The matrix is almost free of electro-conductive particles of carbon black etc., and has electric resistance higher than that of the domain.

When the matrix containing a crosslinked product of a first rubber is formed mainly from ion-conductive raw material rubber having a volume-specific resistivity of $1 \times 10^{12}$ $\Omega \cdot cm$ or less, conduction between domains having electro-conductive particles tends to be improved, so that a three-dimensionally good electro-conductive path is easily formed. On the other hand, when the matrix is formed mainly from insulating raw material rubber having a volume-specific resistivity of more than $1 \times 10^{12}$ $\Omega \cdot cm$, the amount/number of domains having electro-conductive particles necessary for satisfying desired electric resistance as an electro-conductive member tends to increase, and as a result, it is difficult to form a three-dimensionally good electro-conductive path.

(Method for Measuring Electric Resistance of Matrix)

The electric resistance of the matrix can be measured with a very small terminal using a thin section obtained by slicing the electro-conductive layer of the electro-conductive member. Examples of the means for obtaining a thin section include sharp razors, microtomes and FIBs (focused ion beams). With regard to preparation of the thin section, a thin section with a thickness smaller than a distance between domains, which is measured with a transmission electron microscope (TEM) or a scanning electron microscope (SEM) in advance, is prepared for eliminating influences of the domains to measure the electric resistance of only the matrix. Therefore, the means for slicing the electro-conductive layer is preferably means capable of preparing a very thin sample, such as a microtome.

For measurement of the electric resistance value, first, one surface of the thin section is grounded, and locations of the matrix and the domains in the thin section are identified with means capable of measuring the electric resistance values of the matrix and the domains such as an atomic force microscope (AFM), a scanning probe microscope (SPM) or the like. SPM and AFM also enable measurement of a hardness distribution. Subsequently, a probe is made to contact with the matrix, and a grounded current at the time of applying a DC voltage of 50 V is measured, and calculated in terms of electric resistance. Here, means which is also capable of measuring the shape of the thin section, such as SPM or AFM, is preferred because the thickness of the thin section can be measured, so that it is possible to measure the electric resistivity.

In the above-described measurement of electric resistance, one thin section sample is cut out from each of regions obtained by dividing the electro-conductive member into fourths circumferentially and fifths longitudinally, and the above-described measured values are obtained, followed by calculating an arithmetic average of the results for a total of 20 samples.

(Comparison between Electric Resistances of Matrix and Domain)

As described above, the matrix is almost free of electro-conductive particles of carbon black etc., and has electric resistance higher than that of the domain. The ratio of the volume resistivities of the matrix part to the domain part is preferably 5 or more, more preferably 10 or more from the viewpoint of forming electro-conductive paths of the domains.

The ratio of the volume resistivities of the matrix part to the domain part is measured in the following manner. As in the measurement of electric resistance of the matrix, a thin section of the electro-conductive layer is prepared, and the current is measured in a very small region using SPM having a current measuring function. Here, an SPM scanning area containing at least one domain is selected. For example, when the size of the domain is in a submicron order, it is preferable to select a scanning area of several-μm square which contains a plurality of domains. One or more subareas corresponding to the matrix are selected from current mapping data (data with pixels each storing a current value) obtained by performing scanning while applying a fixed voltage, an average value of current data within the plurality of subareas is calculated, and the average current value for the matrix part is defined as Jd. For the domain part, similar analysis is performed, and the average current value for the domain part is defined as Jm. From the above data, Jm/Jd is determined as a resistance ratio (reciprocal of current ratio) between the domain part and the matrix part, and evaluated.

In the above-described measurement of current, one thin section sample of the electro-conductive layer is cut out from each of regions obtained by dividing the electro-conductive member into fourths circumferentially and fifths longitudinally, and the above-described measured values are obtained, followed by calculating an arithmetic average of the results for a total of 20 samples.

[Domain]
(Material of Second Rubber)

The domain that forms the electro-conductive layer contains second rubber. The material of second rubber is not particularly limited as long as it can form domains containing the second rubber when blended with the first rubber at a predetermined ratio. As the material of second rubber, a rubber composition known in the field of electrophotographic electro-conductive members can be suitably used depending on desired physical properties. That is, for example, the rubber materials shown in the section "[Matrix] (Material of First Rubber)" above can be appropriately used as long as these materials are noncompatible with the material of first rubber.

Diene-based rubber containing a double bond on the main chain is preferable because compatibility is enhanced depending on a combination when carbon black is used for electro-conductive particles. Diene-based rubber having a styrene backbone is preferable because compatibility with carbon black tends to be enhanced depending on a combination. Rubber materials having a functional group, which can be expected to interact with electro-conductive particles of carbon black etc., on the main chain or side chain or at the end portion of second rubber are preferable from the viewpoint of fixing electro-conductive particles. The material viscosity can be easily adjusted by appropriately blending liquid rubber as the material of second rubber.

As in the case of the material of first rubber, fillers, softeners, processing aids, tackifiers, anti-adhesive agents, dispersants, foaming agents, electro-conductive aids and the like which are commonly used as the rubber compounding agents can be added to the material of second rubber that forms domains as long as the effects of the present disclosure are not impaired. It is needless to say that volcanizing agents, vulcanization aids and vulcanization accelerators can be added.

The content of the rubber compounding agent blended in the domains depends on raw material rubber selected, and is preferably 0.1 parts by mass or more and 50 parts by mass or less based on 100 parts by mass of the second rubber.

(Electric Resistance of Domain)

The domain is an electro-conductive phase, and effectively transports charge in the electro-conductive path in a high-speed process. Thus, the electric resistivity is preferably low, and specifically, the electric resistivity is preferably $10^{-1}$ Ωcm to $10^3$ Ωcm. The electric resistivity of the domain can be set to a desired value by appropriately adjusting the type and the use amount of electro-conductive particles.

(Electro-conductive Particles)

The electro-conductive domain contains a crosslinked product of a second rubber and electro-conductive particles. Examples of the electro-conductive particles include the following electro-conductive particles: fine particles and fibers based on metals such as aluminum, palladium, iron, copper and silver; fine particles of metal oxides such as titanium oxide, tin oxide and zinc oxide; composite particles obtained by treating the surfaces of the above-described metal-based fine particles, fibers and metal oxides by electrolytic treatment, spray coating or mixing and shaking; electro-conductive carbon blacks such as furnace black, thermal black, acetylene black and Ketjen black; and carbon powder of PAN (polyacrylonitrile)-based carbon, pitch-based carbon and the like. If necessary, two or more of these types of electro-conductive particles can be used in combination.

Here, examples of the furnace black include the following: SAF-HS, SAF, ISAF-HS, ISAF, ISAF-LS, I-ISAF-HS, HAF-HS, HAF, HAF-LS, T-HS, T-NS, MAF, FEF, GPF, SRF-HS-HM, SRF-LM, ECF and FEF-HS. Examples of the thermal black include FT and MT. One of these types of electro-conductive particles (electro-conductive carbon black) can be used alone, or two or more thereof can be used in combination.

The carbon black used is preferably electro-conductive carbon black having a DBP absorption capacity of 40 ml/100 g or more and 150 ml/100 g or less. The DBP (dibutyl phthalate) absorption capacity is a value obtained by indirectly quantifying the structures of primary particles of carbon black. That is, it has been found that use of developed carbon black in which structures having a DBP absorption capacity within the above-described range tends to enhance interaction with the rubber material even when a material of second rubber with low polarity is used. The DBP absorption capacity of carbon black can be measured by the method described in JISK 6217-4 (2001). The electro-conductive carbon black can be distinguished from other fillers such as reinforcing carbon black by microscope observation or the like because structures are highly developed.

The content of electro-conductive particles blended in the domain is 5 parts by mass or more and 150 parts by mass or less, more preferably 20 parts by mass or more and 120 parts by mass or less, based on 100 parts by mass of the second rubber. In particular, the content of electro-conductive particles is still more preferably 50 parts by mass or more and 120 parts by mass or less because percolation in the domain is improved to adequately connect the electro-conductive particles, and as a result, electro-conductive paths in the domain are "electrically densely connected" and stably formed. In addition, the content of electro-conductive particles is particularly preferably 60 parts by mass or more and 120 parts by mass or less because variation in contained electro-conductive particles between domains as described later becomes extremely small.

The electro-conductive particles can act as electro-conductive domains when blended in an amount of 5 parts by mass or more based on 100 parts by mass of the second rubber. However, when the cubic content of electro-conductive particles is small, the domains may be easily migrated and reaggregated by application of heat and dynamics to the domains depending on conditions during blending process using a common mixing apparatus such as a kneader or a roll, or during processing of the electro-conductive member. Thus, the content of electro-conductive particles is more preferably 20 parts by mass or more. Further, when the content of electro-conductive particles is more than 50 parts by mass, the effect thereof tends to be enhanced. The content of electro-conductive particles is preferably 60 parts by mass or more, particularly preferably 80 parts by mass or more. That is, when the content of electro-conductive particles in the domain is high, the domain becomes hard, so that migration can be suppressed.

In addition, when the content of electro-conductive particles is more than 50 parts by mass, the electro-conductive member contains electro-conductive particles in a larger amount as compared to common electrophotographic electro-conductive members. The conductivity of the domain itself is developed when electro-conductive particles in the domain are electrically connected to form adequate electro-conductive paths. The formation of electro-conductive paths correlates with the content and the volume occupancy of electro-conductive particles in the domain, and as the ratio of the electro-conductive particles becomes higher, charge transfer efficiency in the electro-conductive paths can be enhanced because the electro-conductive paths stabilize in terms of percolation. Therefore, an increase in the content of electro-conductive particles enhances the conductivity characteristic, so that preferred effects of the present disclosure are easily developed.

It is most preferable electro-conductive particles be present in only domains. However, even when a method is employed in which a master batch with electro-conductive particles added to only second rubber contained in domains is prepared in advance, and the resulting master batch is then blended with first rubber that is used for forming a matrix, a phenomenon may occur in which a slight amount of electro-conductive particles transfer to the matrix. In the present disclosure, electro-conductive particles may be present in the matrix in an amount small enough to keep from contributing to conductivity. The amount of electro-conductive particles present in the matrix, which is small enough to keep from contributing conductivity, is such that the amount of electro-conductive particles present per unit volume of the matrix is preferably lower than the amount of electro-conductive particles present per unit volume of the domain, and is preferably equal to or less than 1/5, more preferably equal to or less than 1/10, still more preferably equal to or less than 1/100 of the amount of electro-conductive particles present per unit volume of the domain.

(Method for Measuring Electric Resistance of Domain)

The domain according to the present disclosure is an electro-conductive phase, and the electric resistance of the domain may be measured in the same manner as in the measurement of the electric resistance of the matrix.

In the above-described measurement of electric resistance, one thin section sample is cut out from each of regions obtained by dividing the electro-conductive member into fourths circumferentially and fifths longitudinally, and the above-described measured values are obtained, followed by determining an arithmetic average of the results for a total of 20 samples.

(Domain Formation (Sea-Island Structure))

Findings known for polymer blends can be applied to the rubber blend in the electro-conductive layer according to the present disclosure.

In the case of a noncompatible polymer blend, the sea-island structure thereof depends on the viscosity of each polymer and blending conditions, and a polymer with a small composition ratio tends to form domains.

(Means for Uniformly Dispersing Domains in Matrix)

As one of means for uniformly dispersing domains in the matrix, the total volume of domains is increased. That is, even though the number of domains in the matrix is unchanged, the volume occupied by the domains increases. However, the above-described condition (1) is not met when the size of the domain becomes needlessly large as described later. In this case, as a matter of course, dispersion uniformity of domains is deteriorated, and the effects of the present disclosure cannot be obtained.

As one of more effective means for uniformly dispersing domains in the entire matrix, the domains are reduced in size and finely dispersed. That is, even though the total volume of domains in the matrix is unchanged, the number of domains considerably increases due to the size reduction. For example, if there are 100 perfectly spherical domains having a certain radius, and the radii of all the domains decrease to ½, simple calculation shows that the number of domains becomes about 800 while the total volume of the domains is unchanged. Thus, even though the total volume of domains is unchanged, the ratio of domains uniformly present in the entire electro-conductive layer is increased by reducing the domain size to increase the number of domains. As a result, the number of unit cubes meeting the condition (1) increase, so that the effects according to this aspect can be enhanced.

As a theoretical equation in which domains are reduced in size in a polymer blend, the following equation is known.

$$D=[C\sigma/\eta 0\gamma\cdot]\cdot f(\eta 0/\eta)$$

D: dispersion particle diameter (particle diameter of domain) σ: interfacial tension η0: viscosity of matrix η: viscosity of dispersion phase (viscosity of domain) C: constant γ: shear rate That is, in the present disclosure, roughly the following three methods are conceived for reducing the diameter of the domain (island size):

(method A) the interfacial tension between the first rubber and the second rubber is reduced;
(method B) the viscosity of the first rubber and the viscosity of the second rubber are made close to each other; and
(method C) the shear rate during blending is increased.

Method A: Specifically, for uniformly dispersing electro-conductive domains, it is preferable to select a combination which ensures that the difference in solubility parameter (SP value) between the first rubber and the second rubber is small. As a method for reducing the interfacial tension, addition of a compatibilizing agent is preferred. When the difference in SP value is excessively small, it may be difficult to ensure that electro-conductive particles in domains are unevenly present only in the domains, or compatibility may become too high to stably form a sea-island structure.

Method B: Specifically, for uniformly dispersing electro-conductive domains, it is preferable to select a combination of materials of the first rubber and the second rubber so that the viscosities of the rubbers are close to each other at a temperature during kneading. Here, use of liquid rubber or the like as a part of the second rubber of the domains is effective.

Method C: It is effective to simply increase the shear rate during blending or increase the shear time. As described in detail later, the present inventors have found that it is particularly effective to use "elongational shear", rather than "simple shear", as a shear mechanism to be applied, in addition to increasing the shear rate.

(Size of Domain)

The size of the domain in the present disclosure is preferably small as described above.

Specifically, for meeting the condition (1), the size of the domain on a cross-section is preferably 0.1 to 2 μm or less, more preferably 1 μm or less, still more preferably 0.5 μm or less. In particular, when the size of the domain is 0.4 μm or less, extremely high effects of the present disclosure can be expected. When the size of the domain is less than 0.1 μm, it may be impossible to blend a large number of electro-conductive particles in the domain. The size of the domain refers to an equivalent circle diameter. The average domain size refers to an area weighed average domain size.

(Method for Measuring Size of Domain)

In a method for measuring the size of the domain according to the present disclosure, first a fracture surface is neatly formed at a measurement point on a sample by the following means. Here, the fracture surface may be formed by applying a freezing fracture method, a cross polisher method, a focused ion beam (FIB) method or the like to an appropriate thin piece. The FIB method is preferable in light of smoothness of the fracture surface and pretreatment for observation.

Next, pretreatment for obtaining an adequate contrast between the domain and the matrix, such as staining treatment or vapor deposition treatment, may be performed for adequately observing domain structures.

The thin piece subjected to formation of the fracture surface and pretreatment can be observed with a laser microscope, a scanning electron microscope (SEM) or a transmission electron microscope (TEM). In particular, it is preferable to observe the thin piece at a magnification of 10,000 to 100,000 times with SEM from the viewpoint of accuracy of quantification of the areas of domains which are electro-conductive phases.

Hereinafter description will be made in detail in the case of an electro-conductive roller.

First, the electro-conductive roller is cut into round slice samples using a sharp razor. Here, round slice samples of the electro-conductive layer are prepared so that measurement can be performed at three positions of (1/4)l, (2/4)l and (3/4)l from the end portion where l is a length in the longitudinal direction. An electro-conductive layer cross-section part of the round slice sample is subjected to cryo ion-milling treatment at the core and near the center of the surface at intervals of 90 degrees in the circumferential direction of the roller. The surface is exposed by cryo ion-milling treatment. Subsequently, the electro-conductive layer cross-section on the cross-section at each of (1/4)l, (2/4)l and (3/4)l is observed at the core position to the central portion of the surface at intervals of 90 degrees in the circumferential direction of the roller, where the observation is made at a magnification of 5,000 times and with a pixel number of 4,096×3,072 using SEM (product name: Ultraplus, manufactured by Carl Zeiss Company) (a total of 12 images, e.g. SEM images of 20 µm square, can be obtained).

Thereafter, the images obtained through the observation are each subjected to binarization and image analysis with an image analysis apparatus (product name: LUZEX-AP, manufactured by NIRECO CORPORATION), the obtained domain area S is calculated, and then assigned to the calculation formula of $\sqrt{S}/\sqrt{\pi}$ to determine an equivalent circle diameter. In the present disclosure, the equivalent circle diameter is defined as a size of the domain.

(Method for Measuring Volume of Domain)

The volume of the domain can be determined by three-dimensional measurement of the electro-conductive layer using FIB-SEM.

FIB-SEM refers to a method in which a sample is processed with a FIB (focused ion beam) apparatus, and an exposed cross-section is observed with SEM (scanning electron microscope). A stereoscopic structure can be examined by repeating continuous processing and observation to obtain a large number of photographs, and then subjecting the SEM images to 3D reconstruction processing with computer software to construct a sample structure as a three-dimensional stereoscopic image.

Figure 2:
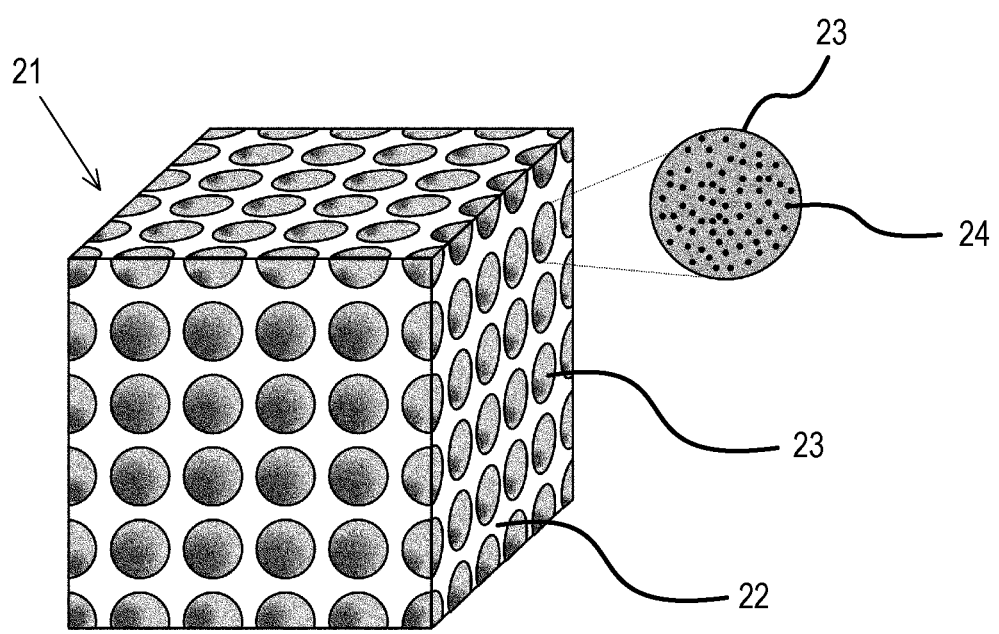
FIG. 2 is a schematic diagram illustrating a structure of an electro-conductive layer having a matrix containing a cross-linked product of a first rubber, and a plurality of domains dispersed in the matrix.

FIG. 2 is a schematic diagram illustrating a structure of an electro-conductive layer having a matrix containing a cross-linked product of a first rubber, and a plurality of domains dispersed in the matrix. As a specific method for measuring the volume of the domain, a three-dimensional stereoscopic image typified by FIG. 2 is obtained using FIB-SEM (manufactured by FEI Company) (described in detail above), and the above-described configuration is confirmed in the obtained image.

That is, the sampling from the electro-conductive layer is performed at arbitrary nine positions, and when the electro-conductive member has a roller shape, one sample is cut out at intervals of 120 degrees in the circumferential direction of the roller at each of three points near (1/4)l, (2/4)l and (3/4)l from the end portion where the length in the longitudinal direction is l.

Thereafter, by three-dimensional measurement performed using FIB-SEM, an image having a cubic shape 9 µm on a side is measured at intervals of 60 nm. Here, the electro-conductive layer cross-section on the cross-section at each of (1/4)l, (2/4)l and (3/4)l is measured at intervals of 120 degrees in the circumferential direction of the roller, where the measurement is made at the core position to the central portion of the surface.

For adequately observing domain structures, it is preferable to perform pretreatment for obtaining an adequate contrast between the domain and the matrix. Here, staining treatment can be preferably performed.

Thereafter, from the obtained image, the volume of domains in 27 unit cubes 3 µm on a side which are contained in one sample having a cubic shape 9 µm on a side is calculated using 3D visualization/analysis software Avizo (registered trademark, manufactured by FEI Company).

The distance between adjacent wall surfaces of domains can be similarly measured using the 3D visualization/analysis software, and can be calculated from an arithmetic average for the total 27 samples after the measured values are obtained.

(Electro-conductive Particles in Domain)

As described above, when "$\sigma/\mu$ is 0 or more and 0.4 or less, and $\mu$ is 20% or more and 40% or less", variation in the number/amount of electro-conductive particles in the domains is small, and therefore the domains are uniform in electric resistance. In particular, it is more preferable that the relationship between $\mu$ and $\sigma$ meet the requirement "$\sigma/\mu$ is 0 or more and 0.25 or less" because the domains are further uniform in electric resistance, and thus variation in electro-conductive particles becomes extremely small, so that the effects of the present disclosure tend to be enhanced.

As one of methods for satisfying the requirement "$\sigma/\mu$ is 0 or more and 0.25 or less", it is effective to increase the fill content of electro-conductive particles blended in the domain as described above. In particular, the present inventors have extensively conducted studies, and resultantly found that it tends to be possible to satisfy the requirement when the ratio of the cross-sectional area of electro-conductive particles contained in each of the domains to the cross-sectional area of each of the domains which appear on the electro-conductive layer is 23% or more, more preferably 28% or more. As described later, mixing processing treatment using an elongational shear apparatus is preferable, and in particular, mixing processing treatment using a continuous elongational shear apparatus is more preferable.

When the electro-conductive particles are carbon black, the average primary particle diameter is 5 nm or more and 60 nm or less, and in particular, preferably 10 nm or more and 50 nm or less, Here, the average primary particle diameter of the electro-conductive particles is an arithmetic average particle diameter. The average primary particle diameter is defined as that of microscopically single crystals or crystallites similar to the single crystals, which have a size of 5 nm or more and 60 nm or less. Examples of the method for measuring the average primary particle diameter include (1) methods using a transmission electron microscope (TEM) in which a target irradiated with an electron beam is transparently observed and (2) methods using a scanning electron microscope (SEM) in which the surface of a target irradiated with an electron beam is observed. The method for calculating the average primary particle diameter is preferably a method in which the average primary particle diameter is directly determined from the measurement image.

(Method for Measuring Area of Electro-Conductive Particles in Domain—Method for Calculating Variation ($\sigma/\mu$) in Electro-Conductive Particles)

The variation can be calculated using SEM images observed in the section "Method for Measuring Size of Domain".

Center parts of 3 µm square are extracted from the SEM images (a total of 12 images), and each subjected to processing for analysis of the area of electro-conductive particles typically of carbon black in each domain and the area of the domain with the aid of a contrast difference inside the domain using an image analysis apparatus (product name: LUZEX-AP, manufactured by NIRECO CORPORATION), and "σ/µ" is calculated, where µ represents an average of ratios of the cross-sectional area of the electro-conductive particles contained in each of the domains to the cross-sectional area of each of the domains appearing on a cross-section of the electro-conductive layer in a thickness direction, and σ represents a standard deviation of the ratios. If there are no domains in the central portion of 3 µm square, another area is randomly selected, and observed with SEM.

(Shape of Domain)

The cross-sectional shape of the domain according to the present disclosure is preferably close to a circular shape. Specifically, the value of circularity shown below is preferably 1 or more and less than 2. A circularity of 1 indicates a true circle.

For obtaining the effects of the present disclosure, the number ratio of domains with a circularity of 1 or more and less than 2 in the domains appearing on a cross-section of the electro-conductive layer is preferably 70% or more. The ratio is more preferably 80% or more because the effects of the present disclosure are enhanced as the ratio increases. It is known that in general, the conductivity characteristic significantly varies depending on the shape and the anisotropic property of electro-conductive particles (Matsutani et al., Int. J. Mod. Phys. C 21 (2010) 709). That is, in domains having a poor circularity and a high aspect ratio, etc., the electric field distribution of the domain has an aspect ratio, i.e. an anisotropic property is developed. Accordingly, an electric field concentration point is formed, and therefore it tends to be difficult to obtain a homogeneous electro-conductive path.

When the value of circularity of the domain is 1.1 or more, preferably 1.5 or more, and less than 2, the interfacial area with the matrix increases, so that the following effect can be expected, which may be preferred. That is, when the electro-conductive member is disposed while contacting a photoreceptor, the electro-conductive member is mechanically compressed in a repetitive manner in the vicinity of a nipple formed between the photoreceptor and the electro-conductive member. Here, in the case of a true circle having an extremely high circularity, it is supposed that migration of domains based on mechanical energy application is easily induced, and as a result, the network structure of electro-conductive paths changes, so that the electric resistance value of the electro-conductive layer varies. On the other hand, when the value of circularity of the domain is 1.1 or more, preferably 1.5 or more, this variation may be suppressed because the interfacial area with the matrix increases.

(Method for Controlling Shape of Domain)

As a method for controlling the shape of the domain, particularly a method for obtaining a domain having a good circularity, in the present disclosure, it is effective to increase the fill content of electro-conductive particles in the domain as described above. That is, when the amount of electro-conductive particles is small, the domains may be easily migrated and reaggregated by application of heat and dynamics depending on conditions during blending process using a common mixing apparatus such as a kneader or a roll, or during processing of the electro-conductive member. However, when the fill content of electro-conductive particles in the domain is high, the domain becomes hard, and as a result, migration can be suppressed, so that deterioration of the circularity due to reaggregation is inhibited.

By increasing the fill content, shear may be easily applied at the time of kneading second rubber blended with electro-conductive particles, leading to improvement of the circularity of the domain.

The above-described methods for reducing the size of the domain (island size) (the methods A to C) are also effective. That is, when the size of the domain decreases, the aspect ratio becomes lower. As described in detail later, the present inventors have found that it is effective to use "elongational shear", rather than "simple shear", as a shear mechanism to be applied, in addition to increasing the shear rate. In particular, mixing processing treatment using a continuous elongational shear apparatus tends to give further preferred results.

(Method for Measuring Shape of Domain and Method for Calculating Circularity)

By a method similar to the method described in "Method for Measuring Size of Domain", the shape of the domain according to the present disclosure can be quantified using the SEM images obtained by performing formation and observation of a fracture surface.

That is, for the domains in the SEM images obtained as described above, binarization and image analysis are performed with an image analysis apparatus (LUZEX-AP, manufactured by NIRECO CORPORATION), and from an average thereof, the circularity is calculated. Here, the circularity is analyzed on the basis of the definition "JIS B 0621: the circularity of a circular form is represented by a difference between the radii of two concentric geometric circles by which the circular form is sandwiched so as to give a minimum distance between the two concentric circles".

When inorganic fillers or roughening particles affect image processing in observation of domains with SEM, the circularity can be calculated with the fillers or particles appropriately excluded by also applying a contrast difference, EDX measurement (SEM/EDX (scanning electron microscope/energy dispersion type X-ray spectroscopy), hardness measurement using SPM measurement separately, or the like.

Here, domains having an equivalent circle radium of 100 nm or more are used for calculation.

(Domain Size Distribution)

In the electro-conductive layer according to this aspect, electro-conductive domains uniform in electric resistance are three-dimensionally equally and densely arranged. Thus, the domain size distribution is preferably such that the domain sizes are uniform and the domains are small in size. Specifically, it has been confirmed that when on the cross-section of the electro-conductive layer, the relationship between the domain size and the number of domains meets the following relational expressions (1) and (2), the effects of the present disclosure are exhibited.

$$80 \leq 100 \times L2/L1 \leq 100; \text{ and} \quad \text{Relational expression (1)}$$

$$0 \leq 100 \times L3/L1 \leq 20 \text{ or less} \quad \text{Relational expression (2)}$$

where L1 represents the total number of the domains appearing on a cross-section of the electro-conductive layer in a thickness direction, L2 represents the number of domains having an area of $3.0 \times 10^4$ nm$^2$ or more and less than $1.2 \times 10^5$ nm$^2$ as measured on the cross-section, and L3 represents the number of domains having an area of $1.2 \times 10^5$ nm$^2$ or more as measured on the cross-section.

When "100×L2/L1" is 95 or more and "100×L3/L1" is 5 or less, the uniformity of the domain size distribution can be extremely high.

(Method for Measuring Domain Size Distribution—"100×L2/L1" and "100×L3/L1")

"100×L2/L1" and "100×L3/L1" can be calculated from the area and the number of domains in the domains, which are obtained by performing analysis in the section "Method for Measuring Size of Domain".

That is, here, "100×L2/L1" and "100×L3/L1" are calculated, where L1 is the total number of the domains, L2 is the number of domains having an area of $3.0×10^4$ nm$^2$ or more and less than $1.2×10^5$ nm$^2$, and L3 is the number of domains having an area of $1.2×10^5$ nm$^2$ or more.

(Method for Controlling Domain Size Distribution)

Here, downsizing of domains and suppression of reaggregation between domains are critical. That is, the method described in "Means for Uniformly Dispersing Domains in Matrix" and the method for suppressing reaggregation of domains, which is described in "Method for Controlling Shape of Domain", are suitably used.

[Method for Producing Electrophotographic Electro-Conductive Member]

The method for producing an electrophotographic electro-conductive member in the present disclosure is not particularly limited as long as it enables formation of an electro-conductive layer having the configuration of the present disclosure as described above, and the electro-conductive member can be formed by appropriately adjusting the following requirements:

(1) selection of a raw material in kneading of an electro-conductive rubber mixture which contains a raw material of first rubber, and a raw material of second rubber containing electro-conductive particles;

(2) composition at the time of kneading the rubber mixture; and (3) type of kneader, shear rate, shear force and kneading time at the time of kneading the rubber mixture.

For example, unvulcanized first rubber is mixed with separately prepared unvulcanized second rubber containing electro-conductive particles, and the mixture is volcanized and cured through appropriate processing processes to obtain an electro-conductive member including an electro-conductive layer having a matrix containing a crosslinked product of a first rubber, and a plurality of domains dispersed in the matrix and containing a crosslinked product of a second rubber.

<Kneading Process>

An elongational shear-type dispersing apparatus is suitably used in addition to a simple shear-type dispersing apparatus which is generally used for mixing and kneading rubber.

In general, dispersion of noncompatible rubber tends to be promoted as the shear force increases or the shearing time (frequency) increases as described above. On the other hand, it is known that with an increase in shear force or shearing time, the amount of shear heat generation increases, so that cutting of rubber molecular chains is promoted, resulting in degradation of materials, and domains are reaggregated. That is, it is important to control the temperature during processing process while applying a shear force.

<Studies on Mixing Machine for Kneading>

(Comparison Between Simple Shear-Type Dispersing Apparatus and Elongational Shear-Type Dispersing Apparatus)

As simple shear-type dispersing apparatuses, conventional rubber mixing apparatuses such as pressure-type kneaders and open rolls, and twin-screw kneading extruders capable applying a larger shear force as compared to the foregoing apparatuses have been heretofore well known. However, in the present disclosure, the fill content of electro-conductive particles in domains tends to increase. In studies by the present inventors, there have been cases where with a simple shear-type dispersing apparatus, it is not possible to uniformly apply shear sufficient to disperse second rubber containing electro-conductive particles, localized heat generation or the like occurs during processing, and as a result, domains cannot be adequately uniformly dispersed.

The present inventors have extensively conducted studies, and resultantly found that a kneader including an elongational shear screw is suitable for adequately uniformly dispersing domains according to the present disclosure in the entire matrix.

Unlike a simple shear mechanism in a pressure-type kneader, an open roll or a twin-screw kneading extruder where a material is gradually ground down and dispersed, the elongational shear thinly stretches and divides a material, so that it is easy to obtain domains which are fine and uniform in size. The fact that rubber exhibits entropic elasticity and thus has a property of absorbing heat when stretched is advantageous to this system, and this may be a cause of enabling suppression of localized heat generation in the elongational shear system.

In this system, even when the fill content of electro-conductive particles in domains increases, it is possible to perform uniform and fine dispersion because higher shear is homogeneously applied as compared to the simple shear system. Here, it has been confirmed that uniform dispersion treatment can be completed in an extremely short time (several seconds).

The present inventors have confirmed that there are cases where the domains cannot be uniformly and finely dispersed in the matrix by merely enhancing the shear force in simple shear processing. Specifically, studies have been conducted using a twin-screw kneading extruder (product name: KZW15TW-4MG-NH (−6000), manufactured by TECH-NOVEL CORPORATION) which is capable of rotating at a high speed and enables attainment of a shear rate unachievable with a conventional pressure-type kneader, open roll or extruder for rubber. Thus, there are cases where gelation and reaggregation of materials, and the like occur, and the domains cannot be uniformly and finely dispersed in the matrix by merely enhancing the shear rate in simple shear processing.

As described above, the mechanism of elongational shear is significantly different from the mechanism of simple shear. That is, the shear flow in simple shear is a flow in which a material is torn by a velocity gradient, while the elongational flow in elongational shear is a flow in which a material is stretched in a main stress direction. Aside from dispersion of rubber materials (viscoelastic bodies) in the present disclosure, Kaziwara et al. have reported that in a Newton fluid/Newton fluid dispersion system, the viscosity ratio is preferably about 1 in the simple shear flow field, whereas in the elongational flow, a droplet is stretched and divided irrespective of the viscosity ratio, and fine dispersion can be performed even in a system with a large viscosity ratio of about 5 or more [Molding, Vol. 23, No. 2, pp. 72-77 (2011)]. It can be thought that probably, the "effect of easy dispersion in elongational shear even when the viscosity ratio of the material is large" is exerted as well in the blend material system of rubber materials as viscoelastic bodies in the present disclosure. This may be the reason why uniform fine dispersion can be performed between the matrix material and the domain material containing a large number of electro-conductive particles.

That is, it is preferable that the electrophotographic electro-conductive member including an electro-conductive layer be produced through the steps of (1) kneading an unvulcanized rubber mixture containing a first unvulcanized rubber as a raw material of the first rubber, a second unvulcanized rubber as a raw material of the second rubber and the electro-conductive particles by using a kneader including an elongational shear screw to prepare an unvulcanized rubber kneaded product, (2) forming a layer of the unvulcanized rubber kneaded product on an outer surface of the electro-conductive substrate, and (3) vulcanizing the first unvulcanized rubber and the second unvulcanized rubber in the layer of the unvulcanized rubber kneaded product to prepare the electro-conductive layer.

Figure 3A:
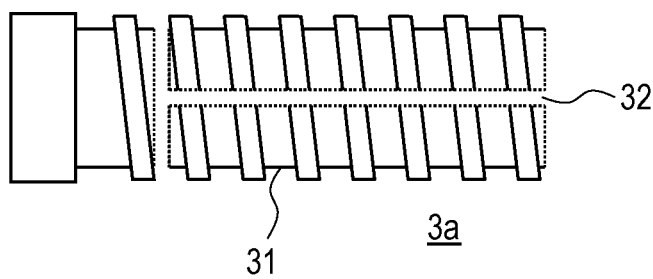
FIG. 3A is a schematic diagram illustrating an example of an elongational shear screw used for preparation of an electro-conductive elastic layer according to this aspect, where the screw has an elongational shear application mechanism inside the screw.
Figure 3B:
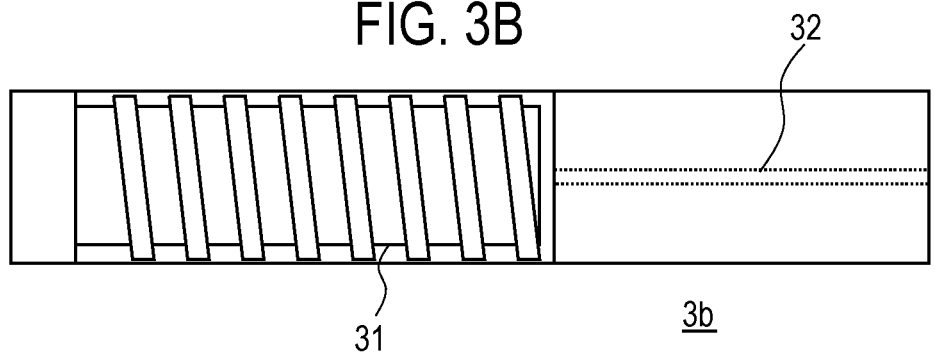
FIG. 3B is a schematic diagram illustrating an example of an elongational shear screw used for preparation of an electro-conductive elastic layer according to this aspect, where the screw has an elongational shear application mechanism outside the screw.

FIGS. 3A and 3B are schematic diagrams illustrating an example of an elongational shear screw used for preparation of an electro-conductive elastic layer according to this aspect. FIG. 3A shows a screw having an elongational shear application mechanism inside the screw, and FIG. 3B shows a screw having an elongational shear application mechanism outside the screw. Preferably, an elongational shear apparatus including an elongational shear screw 31 as shown in FIGS. 3A and 3B is used for application of elongational shear. The elongational screw is classified into ""a batch-circulating type" with a screw 3a having an elongational shear application mechanism (narrow tube) inside the screw 31" as shown in FIG. 3A, and ""a continuous type" with a screw 3b having an elongational shear application mechanism (narrow tube) outside the screw 31" as shown in FIG. 3B.

In the batch-circulating type elongational shear processing apparatus having the screw 3a, a narrow tube hole 32 is provided inside the screw. This apparatus has a mechanism in which during kneading, a rubber composition reaches the leading end portion of screw 31, and is then turned back to the rear end portion of the screw 31 through the narrow tube hole 32 at the leading end of the screw 31. Thus, the rubber composition repeatedly passes through the narrow tube hole, and a shear force associated with elongational movement is applied at the narrow tube hole. The rubber composition can be continuously retained in the elongational shear field, and therefore it is possible to apply a large shear force in a short time. However, reaggregation may occur in some parts depending the retention time, and therefore a continuous type elongational shear processing apparatus may be preferable.

Here, for applying of elongational shear, the narrow tube hole diameter is preferably more than 0.5 mm and not more than 5.0 mm. It has been confirmed that when the narrow tube hole diameter is 5.0 mm or less, shear in the elongational shear is sufficient, and when the narrow tube hole diameter is more than 0.5 mm, a situation does not arise in which processing is difficult because rubber does not sufficiently pass through the narrow tube hole. The narrow tube hole diameter is preferably 1.0 to 3.0 mm. For the treatment time, it is particularly preferable that kneading be performed in a short time. Shear energy applied to the rubber composition varies depending on how large the narrow tube hole diameter is. Thus, from the viewpoint of suppression of heat generation during shear processing, determination of the narrow tube hole diameter as well as control of the feeding rate of the material and the material temperature during mixing, etc. is one of important factors for processing conditions. The number of narrow tube holes is not particularly limited as long as desired domains can be uniformly dispersed, and instead of a narrow tube, a structure enabling a similar elongational shear effect to be obtained, e.g. a double-cylindrical structure, may be used.

The present inventors have extensively conducted studies, and resultantly found that the continuous type is particularly preferable in terms of processing conditions because only elongational shear is efficiently applied.

As the batch-circulating type apparatus, for example, an elongational shear apparatus (micro-shear apparatus manufactured by Imoto Machinery Co., Ltd. or high speed shear apparatus manufactured by NIIGATA MACHINE TECHNO CO., LTD.) is preferably used. As the continuous type apparatus, an apparatus obtained by modifying the screw section of the batch-circulating type apparatus so that the elongational shear application mechanism is provided not inside but outside the screw as shown in FIG. 3B. An apparatus as described in BANDO TECHNICAL REPORT No. 18/2014, P2-P7 etc. can also be used as appropriate.

The present inventors have extensively conducted studies, and in the dispersion treatment step, resultantly confirmed that setting the material temperature during dispersion to 170° C. or lower as measured using an infrared thermometer capable of performing direct measurement gives good results on uniform dispersion. When the temperature at the time of kneading the material is measured with a thermocouple, probably the measured value tends to be lower than the value measured with the infrared thermometer, and thus it may be impossible to obtain good results even when processing treatment is performed at 170° C. or lower. That is, it is effective to precisely control the processing process temperature using a mixing apparatus having an elongational shear mechanism having a function of precisely measuring the material temperature (IR sensor).

It is also preferable to additionally provide a chiller which can be temperature-controlled over a range from −20° C. up to room temperature in order to prevent degradation of the rubber composition by shear heat generation in shear processing of the rubber composition. That is, when the screw section is provided with an infrared temperature sensor which accurately monitors the material temperature during mixing as described above, it is possible to accurately control mixing conditions, and in particular, good results are obtained when the temperature during mixing is set to 170° C. or lower.

<Electrophotographic Image Forming Apparatus>

Figure 4:
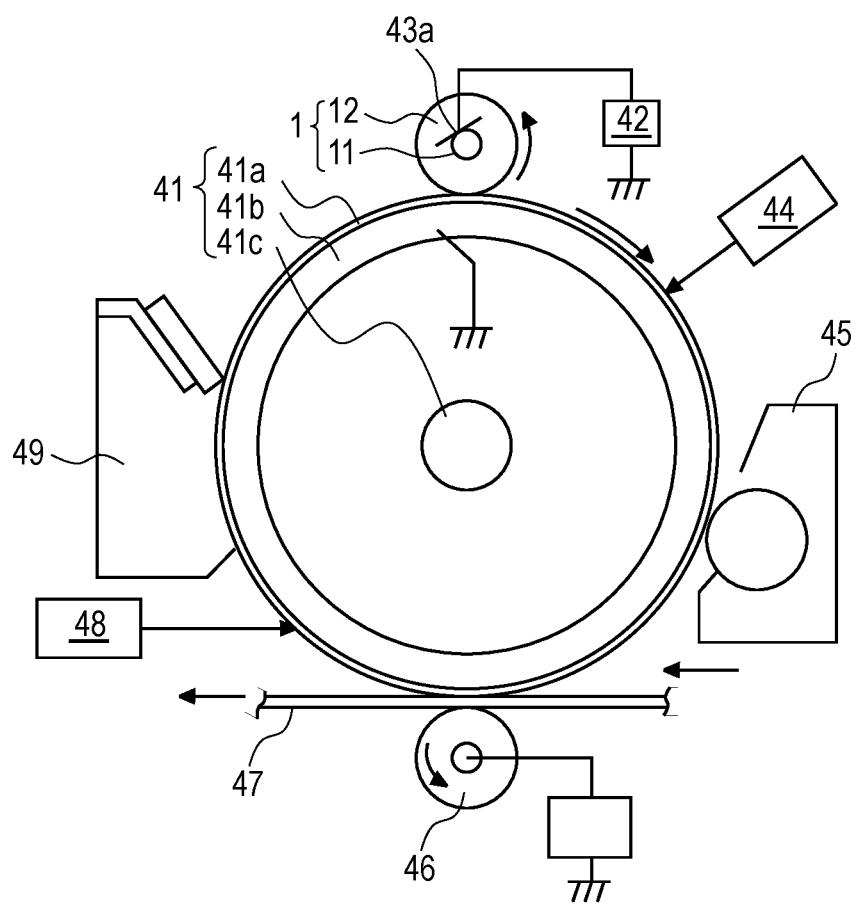
FIG. 4 is a block diagram showing an electrophotographic image forming apparatus according to one aspect of the present disclosure.

An electrophotographic image forming apparatus according to one aspect of the present disclosure includes the electrophotographic electro-conductive member according to one aspect of the present disclosure. FIG. 4 is a schematic block diagram showing an example of the electrophotographic image forming apparatus. A photoreceptor 41 as a body to be charged includes an electro-conductive support 41b of aluminum or the like having conductivity, and a drum shape with a photosensitive layer 41a stacked thereon, and rotationally driven about a support shaft 41c with a predetermined circumferential speed in clockwise direction on the diagram.

The electro-conductive shaft core 11 of a charging roller 1 as the electrophotographic electro-conductive member according to one aspect of the present disclosure is pressed at both ends with pressing means (not shown), so that the electro-conductive layer 12, to which a direct-current (DC) bias is applied by a power source 42 and a sliding electrode 43a through the electro-conductive shaft core, is brought into contact with the photoreceptor 41. Since the charging roller 1 rotates depending on rotation of the photoreceptor 41, the photoreceptor 41 is evenly charged to a predetermined polarity and potential (primary charging).

Subsequently, on the circumferential surface of the photoreceptor subjected to exposure (laser beam scanning exposure, slit exposure of original image, or the like) to target image information from an exposure device 44, an electrostatic latent image corresponding to target image information is formed. A toner supplied by a development member 45 is attached to the electrostatic latent image on the photoreceptor to form the electrostatic latent image into a toner image. Subsequently, a transfer material 47 is conveyed from a sheet feeding section (not shown) to a transfer section between the photoreceptor 41 and a transfer member 46 in synchronization with rotation of the photoreceptor 41, and the transfer member made to have a polarity opposite to that of the toner image is pressed from the back surface of the transfer material to sequentially transfer toner images onto the transfer material 47.

The transfer material 47, to which the toner images have been transferred, is separated from the photoreceptor 41, and conveyed to fixation means (not shown) to fix the toner images to the transfer material, and the transfer material is output as an image-formed material. In an electrophotographic image forming apparatus which forms images on a back surface as well, the transfer material 47 is re-conveyed to between the photoreceptor 41 and the transfer member 46 by reconveyance means for performing image formation again.

The circumferential surface of the photoreceptor 41 after image transfer is subjected to preexposure by a preexposure device 48 to remove residual charge on the photoreceptor (perform neutralization). For the preexposure device 48, known means can be used, and preferred examples thereof include LED chip arrays, fuse lamps, halogen lamps and fluorescent lamps. The neutralized circumferential surface of the photoreceptor 41 is cleaned upon removal of adhering contaminants such as untransferred toners by a cleaning member 49, and provided for image formation in a repetitive manner.

In the electrophotographic image forming apparatus, the charging roller 1 may be driven depending on the photoreceptor 41, may be non-rotating, or may be rotationally driven aggressively with a predetermined circumferential speed in a forward direction or opposite direction with respect to the surface movement direction of the photoreceptor 41. In the case where the electrophotographic image forming apparatus is used as a copying machine, exposure may be performed in the following manner: reflected light or transmitted light from an original is applied, an original is read and converted into signals, and laser beam is scanned on the basis of the signals, or an LED array is driven, or a liquid crystal shutter array is driven.

Examples of the electrophotographic image forming apparatus of the present disclosure include copying machines, laser beam printers, LED printers, and electro-photographic applications such as electro-photomechanical systems.

<Process Cartridge>

Figure 5:
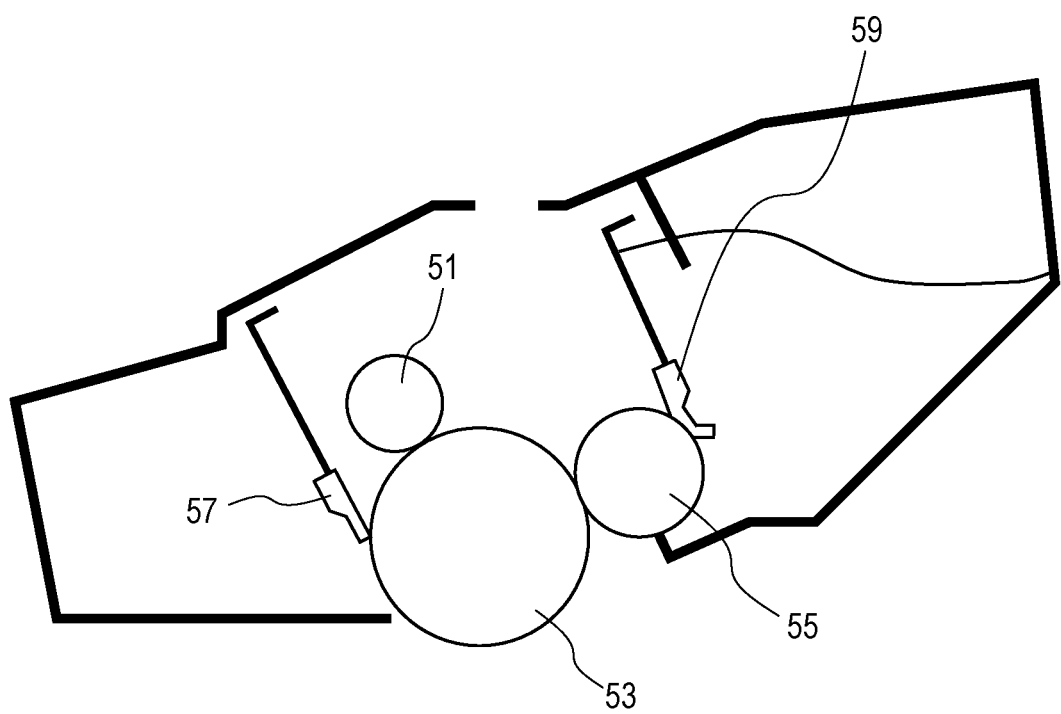
FIG. 5 shows a process cartridge according to one aspect of the present disclosure.

A process cartridge according to one aspect of the present disclosure includes the electro-conductive member, and is detachably attached to the main body of the electrophotographic image forming apparatus. FIG. 5 is a block diagram showing an example of the process cartridge. The process cartridge includes a roller-shaped electro-conductive member according to one aspect of the present disclosure as a charging roller 51. A drum-shaped electrophotographic photoreceptor (hereinafter, also referred to as an "electrophotographic photosensitive drum") 53 is disposed so that the electrophotographic photoreceptor 53 can be charged by the charging roller 51. Here, specifically, the charging roller 51 is pressed to contact the electrophotographic photosensitive drum 53. Further, there are provided a developing roller 55 for supplying a developer for developing a latent image formed on the surface of the electrophotographic photosensitive drum 53, and a cleaning blade 57 for removing a developer remaining on the circumferential surface of the electrophotographic photosensitive drum 53. A development blade 59 is in contact with the developing roller 55. For the development blade 59, a blade-shaped electro-conductive member according to one aspect of the present disclosure can be used.

EXAMPLES

The present disclosure will be described in more detail below by way of Examples, which should not be construed as limiting the present disclosure. Hereinafter, the "part" means the "part by mass" unless otherwise specified, and as reagents etc., commercially available high-purity products were used unless otherwise specified.

In Examples, the A kneaded rubber composition (mixture) refers to an unvulcanized rubber composition (mixture) free of a crosslinker and a vulcanization accelerator, and the B kneaded rubber composition (mixture) refers to an unvulcanized rubber composition (mixture) containing a crosslinker and a vulcanization accelerator.

Example 1

(Preparation of Rubber Mixture)

100 parts of an ethylene-propylene-diene terpolymer (trade name: EPT4045, manufactured by Mitsui Chemical, Incorporated) as a raw material of domains, 3 parts of carbon black (trade name: KETJEN BLACK EC600JD, manufactured by Ketjen Black International Company) and 40 parts of carbon black (trade name: TOKABLACK #7360, manufactured by TOKAI CARBON CO., LTD.) as electro-conductive particles, 10 parts of paraffin oil (trade name: PW-380, manufactured by Idemitsu Kosan Co., Ltd.) as a softener, and 1 part of stearic acid as a processing aid were kneaded with a pressure kneader to give a master batch 1.

Next, 180 parts of an epichlorohydrin-ethylene oxide-allyl glycidyl ether terpolymer (trade name: EPICHLOMER CG, manufactured by OSAKA SODA CO., LTD.), 1 part of stearic acid as a processing aid, 45 parts of the master batch 1, 2.5 parts of 2,5-dimethyl-2,5-di(t-butylperoxy)hexyne (trade name: PERHEXA 25B-40, manufactured by NOF CORPORATION) as a vulcanizing agent, and 1.5 parts of triallyl isocyanurate (trade name: TAIC-M60, manufactured by Nippon Kasei Chemical Company Limited) as a crosslinking aid were mixed by an open roll to give an unvulcanized rubber mixture (B kneaded rubber composition 1). The master batch 1 was divided into five parts, and mixed stepwise.

Preparation of Electro-Conductive Roller

A round bar having a total length of 252 mm and an outer diameter of 6 mm and made of free-cutting steel with a surface subjected to electroless nickel plating treatment was prepared. Next, the round bar was coated with an adhesive on the entire circumference over a length of 230 mm which does not include a length of 11 mm from both ends. As the adhesive, an electro-conductive hot melt type adhesive was used. For the coating, a roll coater was used. The round bar coated with the adhesive was used as an electro-conductive shaft core (core metal).

Next, a crosshead extruder having an electro-conductive shaft core supply mechanism and an unvulcanized rubber roller discharge mechanism was prepared. A die having an inner diameter of 12.5 mm was attached to the crosshead, the extruder and the crosshead were adjusted to 80° C., and the conveyance speed of the electro-conductive shaft core was adjusted to 60 mm/sec. Under the conditions, the B kneaded rubber composition 1 was supplied from the kneading extruder, and a rubber layer of the B kneaded rubber composition 1 was formed on the outer circumferential surface of the electro-conductive shaft core in the crosshead to give an unvulcanized rubber roller. Next, the unvulcanized rubber roller was introduced into a hot-air vulcanization furnace at 170° C., and heated for 60 minutes to give a vulcanized rubber roller. Thereafter, the end portions of the vulcanized rubber layer were removed by cutting to set the length of the rubber layer to 230 nm. Finally, the surface of the elastic layer was polished with a sharping wheel. In this way, a crown-shaped electro-conductive roller was prepared which has a diameter of 8.4 mm at a position of 90 mm from the central portion toward each of both end portions and a diameter of 8.5 mm at the central portion.

The electric resistivity of the roller was $5.0 \times 10^5$ Ω·cm. As a method for measuring the electric resistance, a method as described later in "Measurement of Partial Resistance Value of Electro-conductive Roller" was used.

Evaluation of Electro-Conductive Roller

The electro-conductive roller was evaluated as follows. Table 1 shows the evaluation results.

Evaluation of Electro-Conductive Layer

Details were evaluated by the measurement methods described above.

By the methods described in the methods for measuring domains, etc. it was confirmed that the electro-conductive elastic layer of the electro-conductive roller of each Example had a plurality of domains in the matrix of first rubber; a configuration was obtained in which each domain contains electro-conductive particles; the average μ of ratios of the cross-sectional area of the electro-conductive particles contained in each of the domains to the cross-sectional area of each of the domains was 20% or more and 40% or less; and so on. Unless otherwise specified, Leica EM UC7 (product name) manufactured by Leica was used as a microtome, Leica EMITIC3X (product name) manufactured by Leica Company was used as an ion milling apparatus, and Ultraplus (product name) manufactured by Carl Zeiss Company was used as SEM. In particular, as a three-dimensional stereoscopic image measuring apparatus (FIB-SEM) typified in FIG. 2, CRYO FIB/SEM, Helios G4 UC (product name) manufactured by FEI Company was used to examine the structure of the electro-conductive layer in all Examples.

(Evaluation of Uniform Dispersibility of Domains in Electro-Conductive Layer)

By the method described in the section "Method for Measuring Volume of Domain), it was confirmed that electro-conductive domains were three-dimensionally equally and densely arranged in the electro-conductive layer. Here, as described above, three-dimensional measurement is performed with FIB-SEM to examine whether at least eight of samples with a first cubic shape 9 μm on a side meet the condition (1): "the number of unit cubes in which the total volume of the domains is 2.7 to 10.8 μm³, among 27 unit cubes 3 μm on a side which are contained in one sample, is at least 20".

The effects according to this aspect can be enhanced by increasing the number of unit cubes meeting the condition (1) as described above. The level of uniform dispersibility of domains was evaluated on the basis of the following criteria in light of the above-described measurement results. The levels of uniformity and stability in electric characteristics of the electro-conductive layer are shown by ranks I, II, III, IV and V in descending order.

Rank I: Very good uniform dispersibility (the number of unit cubes meeting the condition (1) is 25 or more in each of at least 8 samples).

Rank II: Fairly good uniform dispersibility (the number of unit cubes meeting the condition (1) is less than 25 in each of at least 2 samples, and 22 or more in each of at least 8 samples).

Rank III: Good uniform dispersibility (the number of unit cubes meeting the condition (1) is less than 22 in each of at least 2 samples, and 20 or more in each of at least 8 samples).

Rank IV: No uniform dispersibility (the number of unit cubes meeting the condition (1) is less than 20 in each of at least 2 samples, and 12 or more in each of at least 8 samples).

Rank V: Very poor uniform dispersibility (the number of unit cubes meeting the condition (1) is less than 12 in each of at least 2 samples).

(Evaluation of Variation in Electro-Conductive Particles in Domains in Electro-Conductive Layer)

By the above-described measurement methods, it was confirmed that the electro-conductive domains were uniform in electric resistance.

The effects according to this aspect are enhanced as "σ/μ" becomes smaller, where μ represents an average of ratios of the cross-sectional area of the electro-conductive particles contained in each of the domains to the cross-sectional area of each of the domains appearing on a cross-section of the electro-conductive layer in a thickness direction, and σ represents a standard deviation of the ratios. The level of variation in electro-conductive particles in the domains is evaluated on the basis of the following criteria in light of the above-described measurement results. The levels of uniformity in electric resistance are shown by ranks i, ii and iii in descending order.

Rank i: Very small variation in electro-conductive particles ($0 \leq \sigma/\mu \leq 0.25$).

Rank ii: Small variation in electro-conductive particles ($0.25 < \sigma/\mu \leq 0.4$)

Rank iii: Large variation in electro-conductive particles ($\sigma/\mu < 0.4$)

(Evaluation of Shape of Domain in Electro-Conductive Layer of Electro-Conductive Roller—Circularity)

The shape of the domain is preferably close to a circular shape, and was evaluated by circularity based on the above-described measurement method.

The level of circularity was evaluated on the basis of the following criteria. The levels of circularity are shown by ranks a, b, c and d in descending order.

Rank a: Very good circularity (the average of the values of circularity is 1 or more and less than 1.90).

Rank b: Good circularity (the average of the values of circularity is 1.90 or more and less than 2.0).

Rank c: Poor circularity (the average of the values of circularity is 2.10 or more and less than 22.60).

Rank d: Very poor circularity (the average of the values of circularity is 2.60 or more).

(Evaluation of Domain Size Distribution in Electro-Conductive Layer)

For the domain size distribution, it is preferable domains be uniform in size and small in size. Evaluation was performed by particle size distribution uniformity based on the ratio of large domains to small domains on the basis of the above-described measurement method.

Here, the particle size distribution uniformity is calculated from evaluations of 12 or more SEM images.

The level of particle size distribution uniformity was evaluated on the basis of the following criteria. The levels of particle size distribution uniformity are shown by ranks 1, 2, 3 and 4 in descending order.

Rank 1: Very high particle size distribution uniformity ($95 \leq 100 \times L2/L1 \leq 100$ and $0 \leq 100 \times L3/L1 \leq 5$).
Rank 2: High particle size distribution uniformity ($80 \leq 100 \times L2/L1 < 95$ and/or $15 < 100 \times L3/L1 \leq 20$).
Rank 3: Poor particle size distribution uniformity ($100 \times L2/L1 < 80$ and/or $20 < 100 \times L3/L1$).
Rank 4: Very poor particle size distribution uniformity ($100 \times L2/L1 \leq 65$ and/or $35 \leq 100 \times L3/L1$).

(Measurement of Resistance of Electro-Conductive Roller)

The resistance of the electro-conductive roller was appropriately measured in accordance with the following two types of "Measurement of Local Resistance Value of Electro-conductive Roller".

Measurement of Local Resistance Value of Electro-Conductive Roller
(Method Using Fixed Electrode)

The value of current passing through an arbitrary local region of the electro-conductive roller was measured using a current resistance measuring apparatus as described in detail below. First, both end portions of the electro-conductive shaft core of the electro-conductive roller are pressed to contact a metal electrode. The metal electrode is cutting-processed so that a surface contacting the electro-conductive roller has a curvature almost identical to that of the outer circumference of the electro-conductive roller, and the length of the circular arc is equal to or less than ¼ of the length of the outer circumference of the electro-conductive roller. Accordingly, the metal electrode can be brought into close contact with the electro-conductive roller. The length of the metal electrode was set so that the area of a contact portion with the electro-conductive roller was about 0.5 cm².

The electric resistance of the local region of the electro-conductive roller was measured while a direct-current voltage was applied to the electro-conductive shaft core of the electro-conductive roller using an external power source with the metal electrode pressed to contact the electro-conductive roller. Voltages at both ends of a reference resistor connected to the metal electrode in series were measured, and the value of current passing through the local region was calculated on the basis of the voltages and the electric resistance value of the reference resistor.

Alternatively, the resistance value of the electro-conductive roller may be measured in the following manner: the current value is measured using an electrometer capable of measuring very small current while a constant direct-current voltage is applied between the electro-conductive shaft core of the electro-conductive roller and the metal electrode. The current value of the electro-conductive roller was measured after elapse of 10 seconds while a fixed direct-current voltage of 20 V was applied between the electro-conductive shaft core and the metal electrode in an environment at a temperature of 23° C. and a relative humidity of 50%.

The volume resistivity (Ω·cm) of the local region was calculated from the measured current value, the area of a contact portion between the electro-conductive roller and the metal electrode, the thickness of the electro-conductive layer of the electro-conductive roller, and the voltage applied to the electro-conductive layer.

Measurement of Local Resistance Value of Electro-Conductive Roller
(Method Using Rotating Electrode)

The value of current passing through a local region of the electro-conductive roller was measured using a current resistance measuring apparatus as described in detail below. In this apparatus, a columnar metallic rotating electrode having a diameter of 30 mm and a width of 20 mm is pressed to contact the electro-conductive roller at an arbitrary position under a fixed pressure, and the electro-conductive roller is rotated, so that the rotating electrode rotates depending on the rotational motion of the electro-conductive roller. Further, voltages at both ends of a reference resistor connected to the rotating electrode in series are measured while a direct-current voltage is applied to the electro-conductive shaft core of the electro-conductive roller using an external power source. Accordingly, a current value passing through a region of the electro-conductive layer of the electro-conductive roller, which is defied by the contact surface between the rotating electrode and the electro-conductive roller. The area of the contact surface depends on the hardness of the electro-conductive layer, and is about 0.05 to 0.2 cm².

The rotation speed of the electro-conductive roller was set to 30 rpm, the data sampling frequency was set to 20 Hz, and the electric resistance value of the reference resistor was set to 1 kΩ. The applied voltage depends on the electric resistivity of the electro-conductive layer, and the fixed voltage was set between 10 V and 200 V so that the current value was about 0.1 mA. The above conditions enable measurement to be performed at intervals of about 0.6 mm in the circumferential direction on the roller surface, so that about 12 regions can be measured per round. The rotating electrode was sequentially moved in the longitudinal direction of the roller, and current measurement was similarly performed in about 140 regions while the electro-conductive roller was rotated.

The volume resistivity (Ω·cm) of the local region was calculated from the measured current value, the area of a contact portion between the electro-conductive roller and the rotating electrode, the thickness of the electro-conductive layer of the electro-conductive roller, and the voltage applied to the electro-conductive layer. Variation in volume resistivity within the electro-conductive roller was evaluated by $\sigma_R/\mu_R$ where $\mu_R$ is an average of volume resistivities of local regions in the measurement, and $\sigma_R$ is a dispersion.

The level of $\sigma_R/\mu_R$ in electric resistance was evaluated on the basis of the following criteria in light of the above-described results. The levels of uniformity and stability in electric characteristics of the electro-conductive layer are shown by ranks A, B, C and D in descending order.

Rank A: Very small $\sigma_R/\mu_R$ ($\sigma_R/\mu_R < 0.3$)
Rank B: Fairly small $\sigma_R/\mu_R$ ($0.3 < \sigma_R/\mu_R \leq 0.4$)
Rank C: Small $\sigma_R/\mu_R$ ($0.4 < \sigma_R/\mu_R < 0.5$)
Rank D: Large $\sigma_R/\mu_R$ ($0.5 \leq \sigma_R/\mu_R$)

Figure 6:
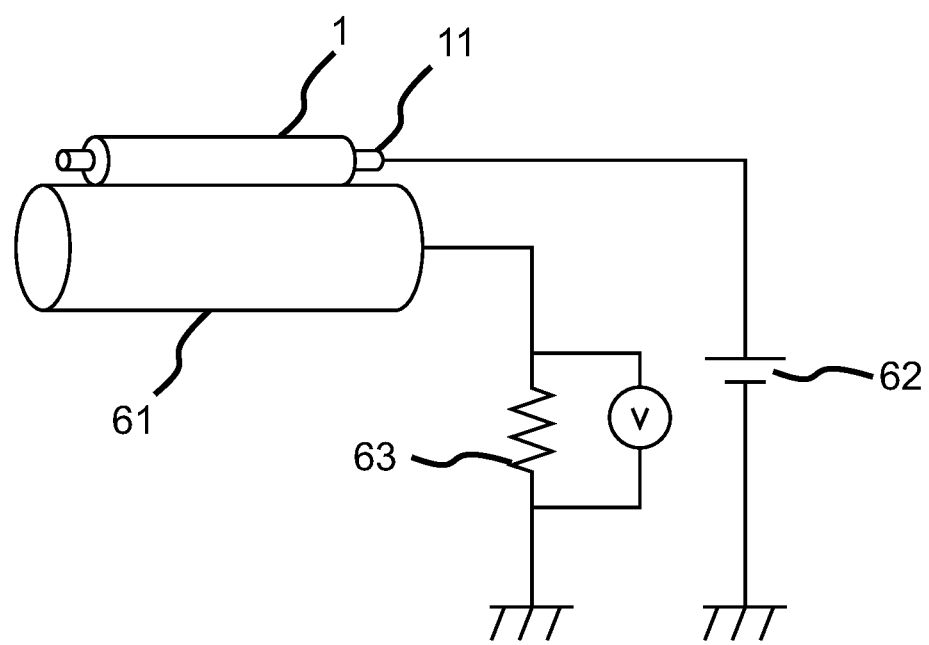
FIG. 6 is a block diagram showing an example of an electric resistance measuring apparatus for measuring the value of a current passing through the electro-conductive member.

Test on Degradation by Passage of Current in Electro-Conductive Roller—Measurement of Current Maintenance Ratio The value of current passing through the electro-conductive roller was measured using an electric resistance measuring apparatus schematically shown in FIG. 6. In this apparatus, both end portions of the electro-conductive shaft core 11 of the electro-conductive roller are pressed to contact a columnar metal drum with a diameter of 30 mm using pressing means (not shown), so that the electro-conductive roller rotates depending on the rotational driving of the metal drum. Further, voltages at both ends of a reference resistor connected to the metal drum in series are measured while a direct-current voltage is applied to the electro-conductive shaft core of the electro-conductive roller using an external power source. The value of current passing through the electro-conductive roller is calculated on the basis of the electric resistance value of the reference resistor 63 and the voltages at both ends of the reference resistor.

A test on degradation by current passage in the electro-conductive roller was conducted in an environment at a temperature of 23° C. and a relative humidity of 50% using the electric resistance measuring apparatus of FIG. 6. Here, a fixed direct-current voltage set to 50 V was applied between the electro-conductive shaft core and the metal drum for 10 minutes. The rotation speed of the metal drum was set to 30 rpm, and the electric resistance value of a reference resistor was set between 100Ω and 1 kΩ. The data sampling frequency was set to 20 Hz, and the average of measured values for I0 minutes were defined as a value of current passing through the electro-conductive roller. The current maintenance ratio (%) was calculated in terms of a ratio of I1 to I0, where I0 is an initial current value, and I1 is a current value at the end of the current passage test.

The level of the current maintenance ratio was evaluated on the basis of the following criteria in light of the above-described results.

The levels of uniformity and stability in electric characteristics of the electro-conductive layer are shown by ranks A, B, C and D in descending order.

Rank A: Very high current maintenance ratio (maintenance ratio of 85% or more).
Rank B: High current maintenance ratio (maintenance ratio of 70% or more and less than 85%).
Rank C: Moderate current maintenance ratio (maintenance ratio of 60% or more and less than 70%).
Rank D: Poor current maintenance ratio (maintenance ratio of less than 60%).

Image Evaluation on Electro-Conductive Roller

Image evaluation on the electro-conductive member in a high-speed process was performed.

First, an electrophotographic laser printer (trade name: Laserjet M608dn, manufactured by Hewlett Packard Company) was prepared as an electrophotography apparatus. Next, the electro-conductive member, the electrophotography apparatus and the process cartridge were left standing in an environment at 23° C. and 50% RH for 48 hours to adapt to the measurement environment.

For performing evaluation in a high-speed process, the laser printer was modified so that the number of output sheets per unit time was larger than the original number of output sheets, i.e. 75 A4-size sheets were output per minute. Here, the output speed of recording media was 370 mm/sec, and the image resolution was 1,200 dpi.

The prepared electro-conductive roller was attached as a charging roller to the electrophotographic process cartridge. In the same environment as described above, a voltage of −900 V was applied to the electro-conductive member by an external power source (Trek615 manufactured by TREK JAPAN) to output a halftone image. That is, one electrophotographic image was output in which a halftone image was formed on an A4-size sheet (image with 1 dot-width lines drawn at intervals of 2 dots in a direction perpendicular to the rotation direction of the electrophotographic photoreceptor). This image is referred to as a "first image". Subsequently, 2,500 electrophotographic images were output in which a 14 point-size alphabetical character "E" was drawn at a print density of 1% on an A4-size sheet. Subsequently, one electrophotographic image was output in which a halftone image was formed an A4-size sheet. This image is referred to as a "2,501st image". All the electrophotographic images were output under an environment at a temperature of 15° C. and a relative humidity of 10%. The first image and the 2,501st image were visually observed, and graininess in the halftone image in the early stage (first image), occurrence of worsening of graininess in the halftone image after endurance (in the 2,501st image), which may result from an increase in electric resistance value of the charging roller, and the degree thereof were evaluated on the basis of the following criteria.

Rank A: Images have no graininess and are uniform from the early stage, and graininess is not worsened even after endurance.
Rank B: Images have no graininess and are uniform in the early stage, and graininess is slightly worsened after endurance.
Rank C: There are images having graininess (worsened graininess) from the early stage.
Rank D: There are a markedly large number of images (worsened graininess) from the early stage.

Example 2

100 parts of SBR (trade name: TUFDENE 2003, manufactured by ASAHI KASEI CORPORATION) as a raw material of domains, 3 parts of carbon black (trade name: KETJEN BLACK EC600JD, manufactured by Ketjen Black International Company) and 40 parts of carbon black (trade name: TOKABLACK #5500, manufactured by TOKAI CARBON CO., LTD.) as electro-conductive particles, and 1 part of stearic acid as a processing aid were kneaded with a pressure kneader to give a master batch 2.

Next, to 100 parts by mass of NBR (trade name: N230SV, manufactured by JSR Corporation) were added 8 parts of zinc oxide (Class-2 Zinc Oxide manufactured by Sakai Chemical Industry Co., Ltd.), 1 part of zinc stearate (trade name: SZ-2000 manufactured by Sakai Chemical Industry Co., Ltd.) and 10 parts of calcium carbonate (trade name: NANOX #30, manufactured by Maruo Calcium Co., Ltd.). Using a pressure kneader (trade name: TD6-15MDX: manufactured by Toshin Co., Ltd.) adjusted to 50° C., the mixture was stirred under the conditions of a filling rate of 70%, a blade rotation speed of 30 rpm and a mixing time of 16 minutes to give a rubber composition 2 for matrixes.

Next, using a pressure kneader, 20 parts of the master batch 2 prepared as described above and 70 parts of the rubber composition 2 for matrixes were mixed for 12 minutes to give an unvulcanized rubber mixture 2.

To 100 parts by mass of the unvulcanized rubber mixture 2 were added 1.8 parts of a vulcanizing agent/sulfur (trade name: SULFAX PMC, manufactured by Tsurumi Chemical Industry Co., Ltd.) and a vulcanization accelerator (trade name: Perkacit TBzTD, manufactured by Performance Additives Company) were added. Using a two-roll mill cooled to a temperature of 25° C., the mixture was kneaded for 10 minutes to give a corresponding B kneaded rubber composition 2. Except for the above, the same procedure as in Example 1 was carried out to prepare an electro-conductive roller, and various characteristics were evaluated.

The electric resistance value of the roller was $6.5 \times 10^5$ Ω·cm.

Example 3

90 parts of SBR (trade name: TUFDENE 2003, manufactured by ASAHI KASEI CORPORATION) and 10 parts of liquid SBR (trade name: LIR-310, manufactured by KURARAY CO., LTD.) as raw materials of domains, 60 parts of carbon black (trade name: TOKABLACK #5500, manufactured by TOKAI CARBON CO., LTD.) as electro-conductive particles, and 1 part of stearic acid as a processing aid were kneaded with a pressure kneader to give a master batch 3. Next, using a pressure kneader, 20 parts of the master batch 3 prepared as described above and 72 parts of the rubber composition 2 for matrixes, which had been prepared in Example 2, were mixed for 13 minutes to give an unvulcanized rubber mixture 3. Here, the master batch was divided into five equal parts, and mixed stepwise.

Except for the above, the same procedure as in Example 2 was carried out to prepare an electro-conductive roller, and various characteristics were evaluated.

The electric resistance of the roller was $8.5 \times 10^5$ Ω·cm.

Example 4

A corresponding rubber mixture was prepared in the same manner as in Example 1.

That is, 120 parts of an epichlorohydrin-ethylene oxide-allyl glycidyl ether terpolymer (trade name: EPICHLOMER CG, manufactured by OSAKA SODA CO., LTD.), 1 part of stearic acid as a processing aid, and 40 parts of the master batch 1 prepared in Example 1 were mixed by an open roll to give an unvulcanized rubber mixture 4. Here, the master batch was divided into five equal parts, and mixed stepwise.

Next, the unvulcanized rubber (A kneaded rubber composition) was kneaded using as an elongational shear molding processing machine a processing machine (product name: NHSS8-28, manufactured by NIIGATA MACHINE TECHNO CO., LTD.) including a screw having an elongational shear application mechanism inside the screw as shown in FIG. 3A. First, the size of a narrow tube hole of the screw provided in the processing machine was set to 2.0 mm, the temperature of a plasticizing section was set to 100° C., the temperature of a kneading section was set to 150° C., the screw rotation speed was set to 750 rpm, and the A kneaded rubber composition was kneaded for 5 seconds. Thereafter, the A kneaded rubber composition was discharged from the kneading section to give a rubber composition subjected to elongational shear processing. This procedure was repeated to prepare the rubber composition in a sufficient amount for preparation of an electro-conductive roller. Here, for reducing shear heat generation, a cooling mechanism was used to control the temperature so that the temperature of the kneading section did not exceed 170° C.

To 100 parts by mass of the A kneaded rubber composition kneaded in the above-described step were added 1.8 parts of a vulcanizing agent/sulfur (trade name: SULFAX PMC, manufactured by Tsurumi Chemical Industry Co., Ltd.) and 6.8 parts of a vulcanization accelerator (trade name: Perkacit TBzTD, manufactured by Performance Additives Company) were added. Subsequently, using a two-roll mill cooled to a temperature of 25° C., the mixture was kneaded for 10 minutes to give a B kneaded rubber composition 4. Except for the above, the same procedure as in Example 1 was carried out to prepare an electro-conductive roller, and various characteristics were evaluated.

The electric resistance of the roller was $1.0 \times 10^6$ Ω·cm.

Example 5

100 parts of SBR (trade name: TUFDENE 2003, manufactured by ASAHI KASEI CORPORATION) as a raw material of domains, 70 parts of carbon black (trade name: TOKABLACK #5500, manufactured by TOKAI CARBON CO., LTD.) as electro-conductive particles, and 1 part of stearic acid as a processing aid were kneaded with a pressure kneader to give a master batch 5. Next, using a pressure kneader, 22 parts of the master batch 5 and 68 parts of the rubber composition 2 for matrixes, which had been prepared in Example 2, were mixed for 20 minutes to give an unvulcanized rubber composition 5.

Except for the above, the same procedure as in Example 2 was carried out to prepare an electro-conductive roller, and various characteristics were evaluated.

The electric resistance of the roller was $4.0 \times 10^5$ Ω·cm.

Example 6

100 parts of end-modified SBR (trade name: TUFDENE E581, manufactured by ASAHI KASEI CORPORATION) as a raw material of domains, 80 parts of carbon black (trade name: TOKABLACK #5500, manufactured by TOKAI CARBON CO., LTD.) as electro-conductive particles, and 1 part of stearic acid as a processing aid were kneaded with a pressure kneader to give a master batch 6.

Next, using a pressure kneader, 25 parts of the master batch 6 prepared as described above and 70 parts of the rubber composition 2 for matrixes, which had been prepared in Example 2, were mixed for 16 minutes to give an unvulcanized rubber composition 6. Here, the master batch was divided into five equal parts, and stepwise mixed with the rubber composition 2 for matrixes.

The electric resistance of the roller was $3.5 \times 10^5$ Ω·cm.

Example 7

100 parts of SBR (trade name: TUFDENE 2003, manufactured by ASAHI KASEI CORPORATION) as a raw material of domains, 85 parts of carbon black (trade name: TOKABLACK #7360, manufactured by TOKAI CARBON CO., LTD.) as electro-conductive particles, and 1 part of stearic acid as a processing aid were kneaded with a pressure kneader to give a master batch 7. Next, 30 parts of the master batch 7 and 65 parts of the rubber composition 2 for matrixes, which had been prepared in Example 2, were mixed by an open roll to give a corresponding unvulcanized rubber mixture 7. Next, as in Example 4, the unvulcanized rubber (A kneaded rubber composition) was kneaded using an elongational shear molding processing machine including a screw having an elongational shear application mechanism inside the screw. Here, processing treatment was performed in the same conditions except that the screw rotation speed was 800 rpm. Except for the above, the same procedure as in Example 4 was carried out to prepare an electro-conductive roller, and various characteristics were evaluated.

The electric resistance of the roller was $8.0 \times 10^5$ Ω·cm.

Example 8

100 parts of emulsification polymerization styrene butadiene rubber, E-SBR (trade name: JSR0202, manufactured by JSR Corporation) and 10 parts of liquid SBR (trade name: LIR-310, KURARAY CO., LTD.) as raw materials of domains, 100 parts of carbon black (trade name: TOKABLACK #5500, manufactured by TOKAI CARBON CO., LTD.) as electro-conductive particles, and 1 part of stearic acid as a processing aid were kneaded with a pressure kneader to give a master batch 8. Next, 34 parts of the master batch 8 and 70 parts of the rubber composition 2 for matrixes, which had been prepared in Example 2, were mixed by an open roll to give an unvulcanized rubber mixture 8.

As an elongational shear molding processing machine, the elongational shear molding processing machine (product name: NHSS8-28, manufactured by NIIGATA MACHINE TECHNO CO., LTD.) including a screw having an elongational shear application mechanism inside the screw, which had been used in Example 7 was modified, and used as a continuous processing machine including a screw having an elongational shear application mechanism outside the screw. That is, use of an apparatus modified at a leading end portion of screw so that a narrow tube hole 32 is provided not inside but outside the screw as shown in FIG. 3B enabled continuous elongation shear molding processing.

Next, as in Example 4, the unvulcanized rubber (A kneaded rubber composition) was kneaded using the above-described continuous elongational shear molding processing machine including a screw having an elongational shear application mechanism. Here, processing treatment was performed under the same conditions except that the screw rotation speed was 600 rpm. Except for the above, the same procedure as in Example 4 was carried out to prepare an electro-conductive roller, and various characteristics were evaluated.

The electric resistance of the roller was $8.0 \times 10^5$ Ωcm.

Example 9

100 parts of NBR (trade name: N230SV, manufactured by JSR Corporation) as a raw material of domains, 60 parts of carbon black (trade name: TOKABLACK #7360, manufactured by TOKAI CARBON CO., LTD.) and 10 parts of carbon black (trade name: KETJEN BLACK EC600JD, manufactured by Ketjen Black International Company) as electro-conductive particles, and 1 part of stearic acid as a processing aid were kneaded with a pressure kneader to give a master batch 9.

Next, to 100 parts by mass of SBR (trade name: ASAPRENE, Y031 manufactured by ASAHI KASEI CORPORATION) were added 8 parts of zinc oxide (Class-2 Zinc Oxide manufactured by Sakai Chemical Industry Co., Ltd.), 1 part of zinc stearate (trade name: SZ-2000 manufactured by Sakai Chemical Industry Co., Ltd.) and 10 parts of calcium carbonate (trade name: NANOX #30, manufactured by Maruo Calcium Co., Ltd.). Using a pressure kneader (trade name: TD6-15MDX: manufactured by Toshin Co., Ltd.) adjusted to 50° C., the mixture was stirred under the conditions of a filling rate of 70%, a blade rotation speed of 30 rpm and a mixing time of 16 minutes to give a rubber composition 9 for matrixes.

Next, 35 parts of the master batch 9 and 70 parts of the rubber composition 9 for matrixes were mixed by an open roll to give a corresponding unvulcanized rubber mixture.

Next, the unvulcanized rubber (A kneaded rubber composition) was kneaded using the continuous elongational shear molding processing machine including a screw having an elongational shear application mechanism outside the screw, which had been used in Example 8. Here, processing treatment was performed under the same conditions except that the screw rotation speed was 650 rpm. Except for the above, the same procedure as in Example 4 was carried out to prepare an electro-conductive roller, and various characteristics were evaluated.

The electric resistance of the roller was $8.3 \times 10^5$ Ωcm.

Comparative Example 1

A rubber mixture was prepared in accordance with Japanese Patent Application Laid-Open No. 2002-003651.

Specifically, 100 parts of an ethylene-propylene-diene terpolymer (trade name: EPT4045, manufactured by Mitsui Chemical, Incorporated) as a domain material, 10 parts of carbon black (trade name: KETJEN BLACK EC600JD, manufactured by Ketjen Black International Company) as electro-conductive particles, 30 parts of paraffin oil (trade name: PW-380, manufactured by Idemitsu Kosan Co., Ltd.) as a softener, and 1 part of stearic acid as a processing aid were kneaded with a pressure kneader to give a master batch. Next, 75 parts of an epichlorohydrin-ethylene oxide-allyl glycidyl ether terpolymer (trade name: EPICHLOMER CG, manufactured by OSAKA SODA CO., LTD.) as a matrix material, 1 part of stearic acid as a processing aid, 35.25 parts of the master batch 10, 2.5 parts of 2,5-dimethyl-2,5-di(t-butylperoxy)hexyne (trade name: PERHEXA 25B-40, manufactured by NOF CORPORATION) as a vulcanizing agent, and 1.5 parts of triallyl isocyanurate (trade name: TAIC-M60, manufactured by Nippon Kasei Chemical Company Limited) as a crosslinking aid were mixed by an open roll to give an unvulcanized rubber mixture 1A. Except for the above, the same procedure as in Example 1 was carried out to prepare an electro-conductive roller, and various characteristics were evaluated.

The electric resistance of the roller was $7.3 \times 10^5$ Ωcm.

Comparative Example 2

Except that a corresponding unvulcanized rubber composition 2A was prepared from a master batch different from the master batch 2 of Example 2 in that the amount of Ketjen black was 3.5 parts and the amount of carbon black was 35 parts, and the kneading time in the pressure kneader during preparation of the unvulcanized rubber composition 2A was 5 minutes, the same procedure as in Example 2 was carried out to prepare an electro-conductive roller, and various characteristics were evaluated.

The electric resistance of the roller was $4.1 \times 10^6$ Ωcm.

Comparative Example 3

An electro-conductive roller was prepared on the basis of Comparative Example 1, and various characteristics were evaluated.

Here, 120 parts of an epichlorohydrin-ethylene oxide-allyl glycidyl ether terpolymer (trade name: EPICHLOMER CG, manufactured by OSAKA SODA CO., LTD.), 1 part of stearic acid as a processing aid and 40.5 parts of the master batch 1 were mixed by an open roll to give an unvulcanized rubber mixture.

Next, shear processing of the A kneaded rubber composition was performed such that the unvulcanized rubber composition (A kneaded rubber composition) was kneaded at a rotation speed 1,000 rpm using a twin-screw kneading processing apparatus (product name: KZW15TW-4MG-NH (−6000), manufactured by TECHNOVEL CORPORATION).

100 parts by mass of the unvulcanized rubber composition prepared in the above-described step was mixed with 2.5 parts of 2,5-dimethyl-2,5-di(t-butylperoxy)hexyne (trade name: PERHEXA 25B-40, manufactured by NOF CORPORATION) as a vulcanizing agent and 1.5 parts of triallyl isocyanurate (trade name: TAIC-M60, manufactured by Nippon Kasei Chemical Company Limited) as a crosslinking aid by an open roll to give an unvulcanized rubber mixture (B kneaded rubber composition 3A). Except for the above, the same procedure as in Comparative Example 1 was carried out to prepare an electro-conductive roller, and various characteristics were evaluated.

The electric resistance of the roller was $1.2 \times 10^7$ Ωcm.

Comparative Example 4

Except that a corresponding unvulcanized rubber composition 4A was prepared from a master batch different from the master batch 2 of Example 2 in that the amount of Ketjen black was 3.5 parts and the amount of carbon black was 35 parts, and the kneading time in the pressure kneader during preparation of the unvulcanized rubber composition 4A was 40 minutes (here, the material temperature (measured with an infrared thermometer) during kneading increased to 183 degrees), the same procedure as in Example 2 was carried out to prepare an electro-conductive roller, and various characteristics were evaluated.

The electric resistance of the roller was $2.2 \times 10^6$ Ωcm.

Comparative Example 5

25 parts of the master batch 3 prepared in Example 3 and 70 parts of the rubber composition 2 for matrixes, which had been prepared in Example 2, were mixed using a two-roll mill. Thereafter, except that a corresponding unvulcanized rubber mixture 5A (A kneaded rubber composition) was kneaded at a rotation speed of 1,000 rpm using the twin-screw kneading processing apparatus shown in Comparative Example 3, the same procedure as in Example 3 was carried out to prepare an electro-conductive roller, and various characteristics were evaluated.

The electric resistance of the roller was $9.6 \times 10^6$ Ωcm.

Comparative Example 6

Except that mixing in Example 8 was performed for 10 minutes using a pressure kneader instead of an elongational shear molding processing machine, and 20 parts of the master batch 8 and 70 parts of the rubber composition 2 for matrixes, which had been prepared in Example 2, were used, the same procedure as in Example 8 was carried out to prepare an electro-conductive roller, and various characteristics were evaluated.

The electric resistance of the roller was $9.0 \times 10^5$ Ωcm.

Comparative Example 7

Except that mixing in Example 8 was performed using a two-roll mill (here, the master batch was divided into ten equal parts, and mixed stepwise) instead of an elongational shear molding processing machine, 14.6 parts of the master batch 8 and 70 parts of the rubber composition 2 for matrixes, which had been prepared in Example 2, were used, the same procedure as in Example 8 was carried out to prepare an electro-conductive roller, and various characteristics were evaluated.

The electric resistance of the roller was $4.9 \times 10^6$ Ωcm.

Table 1 below shows the results of evaluation of uniformity of domains, the results of evaluation of variation in electro-conductive particles in domains, the results of evaluation of the shapes of domains, the results of evaluation of particle size distributions of domains, mixing apparatuses used, average domain sizes on cross-sections, the results of evaluation of electro-conductive rollers: electric resistance $\sigma/\mu$ and current maintenance ratio, and the results of evaluation on image quality ranks in Examples 1 to 9 and Comparative Examples 1 to 7.

TABLE 1

| | | | Evaluation of domains | | | | | | | | | | | | |
|---|---|---|---|---|---|---|---|---|---|---|---|---|---|---|---|
| | | | Uniformity | | | | | | | | | Variation in electro-conductive particles | Domain shape | | Size distribution |
| | | | Number of unit cubes meeting condition (1) | | | | | | | | | | | Average | |
| | | Rank | 1 | 2 | 3 | 4 | 5 | 6 | 7 | 8 | 9 | Rank | $\sigma/\mu$, $\mu$(%) | Rank | circularity | Rank |
| Example | 1 | III | 19 | 21 | 23 | 22 | 24 | 25 | 23 | 25 | 27 | (ii) | 0.31, 20 | (c) | 2.30 | (3) |
| | 2 | II | 21 | 24 | 27 | 26 | 27 | 26 | 26 | 25 | 26 | (ii) | 0.28, 22 | (c) | 2.10 | (3) |
| | 3 | III | 21 | 22 | 23 | 21 | 24 | 25 | 26 | 25 | 27 | (i) | 0.16, 24 | (c) | 2.10 | (3) |
| | 4 | I | 27 | 27 | 24 | 26 | 27 | 26 | 26 | 27 | 25 | (ii) | 0.27, 20 | (b) | 1.95 | (2) |
| | 5 | II | 24 | 22 | 27 | 27 | 27 | 19 | 26 | 27 | 26 | (ii) | 0.27, 27 | (c) | 2.00 | (3) |
| | 6 | II | 24 | 22 | 27 | 27 | 27 | 23 | 26 | 27 | 26 | (i) | 0.22, 30 | (b) | 1.95 | (2) |
| | 7 | I | 27 | 27 | 25 | 27 | 26 | 26 | 26 | 27 | 27 | (i) | 0.11, 31 | (a) | 1.82 | (2) |
| | 8 | I | 27 | 27 | 27 | 27 | 27 | 27 | 27 | 27 | 27 | (i) | 0.05, 32 | (a) | 1.79 | (1) |
| | 9 | I | 27 | 27 | 27 | 27 | 27 | 27 | 27 | 27 | 26 | (i) | 0.04, 36 | (a) | 1.78 | (1) |
| Comparative Example | 1 | V | 11 | 10 | 17 | 16 | 17 | 8 | 10 | 16 | 9 | (iii) | 0.41, 18 | (d) | 2.50 | (4) |
| | 2 | IV | 12 | 17 | 19 | 12 | 14 | 13 | 9 | 13 | 15 | (ii) | 0.35, 19 | (d) | 2.60 | (4) |
| | 3 | III | 19 | 22 | 23 | 21 | 24 | 24 | 23 | 25 | 24 | (iii) | 0.42, 18 | (c) | 2.30 | (3) |
| | 4 | V | 9 | 9 | 13 | 16 | 14 | 10 | 16 | 8 | 10 | (ii) | 0.33, 22 | (d) | 2.80 | (4) |
| | 5 | IV | 15 | 17 | 17 | 9 | 12 | 13 | 14 | 13 | 12 | (i) | 0.23, 24 | (c) | 2.50 | (3) |
| | 6 | V | 13 | 9 | 8 | 11 | 8 | 8 | 5 | 7 | 8 | (ii) | 0.37, 32 | (d) | 3.00 | (4) |
| | 7 | V | 6 | 7 | 6 | 8 | 8 | 14 | 8 | 5 | 8 | (ii) | 0.38, 32 | (d) | 3.30 | (4) |

| | | Evaluation of domains Size distribution | | Mixing apparatus | Average domain size on cross-section (μm) | Evaluation of electro-conductive roller | | Image quality rank |
|---|---|---|---|---|---|---|---|---|
| | | L2/L1 | L3/L1 | | | Electric resistance $\sigma_R/\mu_R$ | Current maintenance ratio | |
| Example | 1 | 67 | 33 | Pressure-type kneader | 1.53 | C | C | C |

TABLE 1-continued

|  |  |  |  |  |  |  |  |  |
|---|---|---|---|---|---|---|---|---|
|  | 2 | 71 | 29 | Pressure-type kneader | 0.84 | B | C | C |
|  | 3 | 69 | 31 | Pressure-type kneader | 0.92 | C | B | C |
|  | 4 | 81 | 19 | Elongational shear apparatus | 0.53 | B | C | B |
|  | 5 | 75 | 25 | Pressure-type kneader | 0.60 | B | C | C |
|  | 6 | 82 | 18 | Pressure-type kneader | 0.51 | B | B | C |
|  | 7 | 93 | 7 | Elongational shear apparatus | 0.40 | A | B | B |
|  | 8 | 100 | 0 | Continuous elongational shear apparatus | 0.33 | A | A | A |
|  | 9 | 96 | 4 | Continuous elongational shear apparatus | 0.37 | A | A | A |
| Comparative Example | 1 | 35 | 65 | Pressure-type kneader | 4.50 | D | D | D |
|  | 2 | 48 | 52 | Pressure-type kneader | 3.20 | D | D | D |
|  | 3 | 54 | 46 | Twin-screw kneading extruder | 2.50 | C | D | D |
|  | 4 | 30 | 70 | Pressure-type kneader | 5.10 | D | D | D |
|  | 5 | 32 | 68 | Twin-screw kneading extruder | 4.90 | D | C | D |
|  | 6 | 19 | 81 | Pressure-type kneader | 7.20 | D | D | D |
|  | 7 | 10 | 90 | Pressure-type kneader | >15 | D | D | D |

The results of evaluation of the electro-conductive member applied to a transfer roller as an electro-conductive roller will be described below.

Example 10

Preparation of Electro-Conductive Roller

A round bar having a total length of 240 mm and an outer diameter of 5 mm and made of free-cutting steel with a surface subjected to electroless nickel plating treatment was prepared. Next, the round bar was coated with an adhesive on the entire circumference over a length of 210 mm which does not include a length of 15 mm from both ends. As the adhesive, an electro-conductive hot melt type adhesive was used. For the coating, a roll coater was used. The round bar coated with the adhesive was used as an electro-conductive shaft core (core metal).

Next, a crosshead extruder having an electro-conductive shaft core supply mechanism and an unvulcanized rubber roller discharge mechanism was prepared. A die having an inner diameter of 13.5 mm was attached to the crosshead, the extruder and the crosshead were adjusted to 80° C., and the conveyance speed of the electro-conductive shaft core was adjusted to 60 mm/sec. Under the conditions, the unvulcanized rubber mixture 2 obtained in Example 2 was supplied from the kneading extruder, and a rubber layer of the unvulcanized rubber mixture was formed on the outer circumferential surface of the electro-conductive shaft core in the crosshead to give an unvulcanized rubber roller. Next, the unvulcanized rubber roller was introduced into a hot-air vulcanization furnace at 170° C., and heated for 60 minutes to give a vulcanized rubber roller. Thereafter, the end portions of the vulcanized rubber layer were removed by cutting to set the length of the rubber layer to 215 nm. Finally, the surface of the elastic layer was polished with a sharping wheel. In this way, a crown-shaped electro-conductive roller was prepared which has a diameter of 11.3 mm at a position of 90 mm from the central portion toward each of both end portions and a diameter of 11.5 mm at the central portion.

The electric resistivity of the roller was $2.0 \times 10^6$ $\Omega \cdot cm$.

Evaluation on the obtained electro-conductive roller was performed in the same manner as in Example 1 except for image quality evaluation. Here, image quality evaluation 1 on the electro-conductive roller and image quality evaluation 2 on the electro-conductive roller as described below are added instead of the image quality evaluation in Example 1.

Image Evaluation 1 on Electro-Conductive Roller

As a transfer roller, the electro-conductive roller was attached to an electrophotographic process cartridge (trade name: HP 30A Black Original LaserJet Toner, manufactured by Hewlett Packard Company). The process cartridge was attached to an electrophotographic image forming apparatus (trade name: HP LaserJet Pro M203dw, manufactured by Hewlett Packard Company) capable of treating A4-size sheets, so that electrophotographic images were formed. One electrophotographic image was output in which a vertical line image was formed on an A4-size sheet (image with 4 dot-width lines drawn at intervals of 4 dots in the rotation direction of an electrophotographic photoreceptor). The electrophotographic image was output in an environment at a temperature of 15° C. and a relative humidity of 10%. The image was visually observed, and occurrence of dotted images or worn-out vertical lines, which may result from abnormal discharge of the transfer roller, and the degree thereof were evaluated on the basis of the following criteria.

Rank A: Worn-out vertical lines or dotted images do not appear.
Rank B: Worn-out vertical lines or dotted images slightly appear.
Rank C: Worn-out vertical lines or dotted images appear.
Rank D: Worn-out vertical lines or dotted images markedly appear.

Image Evaluation 2 on Electro-Conductive Roller

As a transfer roller, the electro-conductive roller after conduction of the test on degradation by current passage was attached to an electrophotographic process cartridge (trade name: HP 30A, Black Original LaserJet Toner, manufactured by Hewlett Packard Company). The process cartridge was attached to an electrophotographic image forming apparatus (trade name: HP LaserJet Pro M203dw, manufactured by Hewlett Packard Company) capable of treating A4-size sheets, so that electrophotographic images were formed. One electrophotographic image was output in which a halftone image was formed on an A4-size sheet (image with 1 dot-width lines drawn at intervals of 2 dots in a direction perpendicular to the rotation direction of an electrophotographic photoreceptor). The electrophotographic image was output in an environment at a temperature of 15° C. and a relative humidity of 10%. The image was visually observed, and occurrence of dotted images, which may result from an increase in electric resistance value of the transfer roller, and the degree thereof were evaluated on the basis of the following criteria.

Rank A: Dotted images do not appear.
Rank B: Dotted images slightly appear.
Rank C: Dotted images appear.
Rank D: Dotted images markedly appear.

Example 11

In Example 10, the unvulcanized rubber mixture 4 obtained in Example 4 was used as an unvulcanized rubber mixture.

Except for the above, the same procedure as in Example 10 was carried out to prepare an electro-conductive roller, and various characteristics were evaluated.

The electric resistivity of the roller was $3.2 \times 10^6$ Ωcm.

Example 12

In Example 10, the unvulcanized rubber mixture 8 obtained in Example 8 was used as an unvulcanized rubber mixture.

Except for the above, the same procedure as in Example 10 was carried out to prepare an electro-conductive roller, and various characteristics were evaluated.

The electric resistivity of the roller was $2.4 \times 10^6$ Ωcm.

Comparative Example 8

With respect to Example 10, the unvulcanized rubber mixture 1A obtained in Comparative Example 1 was used as an unvulcanized rubber mixture.

Except for the above, the same procedure as in Example 10 was carried out to prepare an electro-conductive roller, and various characteristics were evaluated.

The electric resistivity of the roller was $2.1 \times 10^6$ Ωcm.

Table 2 below shows the results of evaluation of uniformity of domains, the results of evaluation of variation in electro-conductive particles in domains, the results of evaluation of the shapes of domains, the results of evaluation of particle size distributions of domains, mixing apparatuses used, average domain sizes on cross-sections and the results of evaluation of electro-conductive rollers in Examples 10 to 12 and Comparative Example 8.

TABLE 2

| | | | Evaluation of domains | | | | | | | | | | | | |
|---|---|---|---|---|---|---|---|---|---|---|---|---|---|---|---|
| | | | Uniformity | | | | | | | | | Variation in electro-conductive particles | | Domain shape | | Size |
| | | | Number of unit cubes meeting condition (1) | | | | | | | | | | | | Average | distribution |
| | | Rank | 1 | 2 | 3 | 4 | 5 | 6 | 7 | 8 | 9 | Rank | σ/μ, μ(%) | Rank | circularity | Rank |
| Example | 10 | II | 27 | 24 | 26 | 25 | 26 | 26 | 27 | 21 | 25 | (ii) | 0.28, 22 | (c) | 2.10 | (3) |
| | 11 | I | 26 | 27 | 25 | 26 | 27 | 27 | 26 | 27 | 24 | (ii) | 0.27, 20 | (b) | 1.95 | (2) |
| | 12 | I | 27 | 27 | 27 | 27 | 27 | 27 | 27 | 27 | 27 | (i) | 0.05, 32 | (a) | 1.79 | (1) |
| Comparative Example | 7 | V | 11 | 10 | 17 | 16 | 17 | 8 | 10 | 16 | 9 | (iii) | 0.41, 18 | (d) | 2.50 | (4) |

| | | Evaluation of domains | | | Average domain size on cross-section (μm) | Evaluation of electro-conductive roller | | Evaluation of image | |
|---|---|---|---|---|---|---|---|---|---|
| | | Size distribution | | Mixing apparatus | | Electric resistance $\sigma_R/\mu_R$ | Current maintenance ratio | Evaluation 1 | Evaluation 2 |
| | | L2/L1 | L3/L1 | | | | | | |
| Example | 10 | 71 | 29 | Pressure-type kneader | 0.84 | B | C | C | C |
| | 11 | 81 | 19 | Elongational shear apparatus | 0.53 | B | C | B | B |
| | 12 | 100 | 0 | Continuous elongational shear apparatus | 0.33 | A | A | A | A |
| Comparative Example | 7 | 34 | 66 | Pressure-type kneader | 4.32 | D | D | D | D |

The results of evaluation of the electro-conductive member applied to an electro-conductive blade as an electro-conductive roller will be described below.

Example 13

Preparation of Electro-Conductive Blade

The B kneaded rubber mixture 2 (unvulcanized rubber mixture) obtained in Example 2 was used. Here, the B kneaded rubber mixture 2 was put in a mold having a width of 250 mm, a length of 150 mm and a thickness of 0.7 mm, and treated at 160° C. for 10 minutes with pressure applied by a pressing machine to give a corresponding rubber sheet 1 having a thickness of 0.7 mm The rubber sheet 1 was cut to a width of 216 mm and a length of 12 mm, and bonded to a metal plate (substantially identical in shape to a metal plate used for a development blade of an electrophotographic process cartridge as described later), which had been processed beforehand so as to be attachable to a predetermined cartridge, with an adhesive to give an electro-conductive rubber blade 1. Here, the bonding was performed in such a manner that a portion of the 12 mm-long electro-conductive blade, which overlapped the metal plate, had a length of 4.5 mm, and the other portion with a length of 7.5 mm protruded from the metal plate. As the adhesive, an electro-conductive hot-melt-type adhesive was used.

The electric resistance of the electro-conductive blade was $4.2 \times 10^5$ Ωcm.

Evaluation of Electro-Conductive Blade

Evaluation on the electro-conductive blade was performed as follows. Table 1 shows the evaluation results.

(Evaluation of Electro-Conductive Layer)

For the following four items of evaluation on the electro-conductive layer, evaluation was performed in the same manner as in Example 1.

The measurement points were changed as follows.

Evaluation of Uniform Dispersibility of Domains in Electro-Conductive Layer

Measurement points: Nine points near the center of each of segments having a width of 24 mm, a length of 12 mm and a thickness of 0.7 mm and obtained by dividing the rubber sheet widthwise into nine parts.

Evaluation of Variation in Electro-Conductive Particles in Domains in Electro-Conductive Layer Measurement points: Twelve points near the center of each of segments having a width of 18 mm, a length of 12 mm and a thickness of 0.7 mm and obtained by dividing the rubber sheet widthwise into twelve parts.

Evaluation of Shape of Domain in Electro-Conductive Layer of Electro-Conductive Blade—Circularity Measurement points: Twelve points near the center of each of segments having a width of 18 mm, a length of 12 mm and a thickness of 0.7 mm and obtained by dividing the rubber sheet widthwise into twelve parts.

Evaluation of Particle Size Distribution of Domains in Electro-Conductive Layer

Measurement points: Twelve points near the center of each of segments having a width of 18 mm, a length of 12 mm and a thickness of 0.7 mm and obtained by dividing the rubber sheet widthwise into twelve parts.

(Measurement of Current Value of Electro-Conductive Blade)

Measurement of Local Resistance Value of Electro-Conductive Blade

The value of current passing through an arbitrary local region of the electro-conductive blade was measured using a current resistance measuring apparatus schematically shown below. In the apparatus, a metal electrode was pressed to contact the electro-conductive blade at an arbitrary position on a rubber portion of the electro-conductive blade under a load of 200 gw. The contact portion of the metal electrode with the electro-conductive blade had a circular shape of Φ10 mm. Further, voltages at both ends of a reference resistor connected to the metal electrode in series were measured while a direct-current voltage was applied to the metal plate of the electro-conductive blade using an external power source. In this way, a value of current passing through an arbitrary local region of the electro-conductive blade was obtained. The electric resistance value of the reference resistor was set to 1 kΩ. The electro-conductive blade was divided longitudinally into 20 parts, and measurement was performed at a total of 20 regions thus obtained.

The volume resistivity of the electro-conductive blade was determined by calculating the volume resistivity (Ω·cm) of a local region from the areas of the rubber portion of the electro-conductive blade and the metal electrode, the thickness of the rubber portion of the electro-conductive blade, and the voltage applied. Variation in volume resistivity within the electro-conductive blade was evaluated by $\sigma_R/\mu_R$, where $\mu_R$ is an average of volume resistivities of local regions in the measurement, and $\sigma_R$ is a dispersion.

The level of $\sigma_R/\mu_R$ in electric resistance was evaluated on the basis of the following criteria in light of the above-described results. The levels of uniformity and stability in electric characteristics of the electro-conductive layer are shown by ranks A, B, C and D in descending order.

Rank A: Very small $\sigma_R/\mu_R$ ($\sigma_R/\mu_R < 0.25$)
Rank B: Fairly small $\sigma_R/\mu_R$ ($0.25 < \sigma_R/\mu_R \leq 0.32$)
Rank C: Small $\sigma_R/\mu_R$ ($0.32 < \sigma_R/\mu_R < 0.4$)
Rank D: Large $\sigma_R/\mu_R$ ($0.4 \leq \sigma_R/\mu_R$)

Test on Degradation by Passage of Current in Electro-Conductive Blade—Measurement of Current Maintenance Ratio A test on degradation by passage of current in the electro-conductive blade was conducted in an environment at a temperature of 23° C. and a relative humidity of 50% using the aforementioned electric resistance value measuring apparatus. Here, a fixed direct-current voltage was set between 20 V and 200 V was applied to the metal plate of the electro-conductive blade for 10 minutes. The data sampling frequency was set to 20 Hz, and the average of measured values for 10 seconds was defined as a value of current passing through the electro-conductive blade. The current maintenance ratio (%) was calculated in terms of a ratio of I1 to I0, where I0 is an initial current value, and I1 is a current value at the end of the current passage test.

The level of the current maintenance ratio was evaluated on the basis of the following criteria in light of the above-described results.

The levels of uniformity and stability in electric characteristics of the electro-conductive layer are shown by ranks A, B, C and D in descending order.

Rank A: Very high current maintenance ratio (maintenance ratio of 85% or more).
Rank B: High current maintenance ratio (maintenance ratio of 70% or more and less than 85%).
Rank C: Moderate current maintenance ratio (maintenance ratio of 60% or more and less than 70%).
Rank D: Poor current maintenance ratio (maintenance ratio of less than 60%).

[Evaluation of Frictional Charge Amount Distribution of Toner]

For evaluating the extent of the frictional charge amount of the toner, the frictional charge amount distribution was measured.

As a development blade, the electro-conductive blade was attached to an electrophotographic process cartridge (trade name: 37X Black Toner Cartridge, manufactured by Hewlett Packard Company). The process cartridge was attached to an electrophotographic image forming apparatus (trade name: HP LaserJet Enterprise M608dn, manufactured by Hewlett Packard Company) capable of treating A4-size sheets, placed in a high-temperature and high-humidity environment at an atmospheric temperature of 32° C. and a relative humidity of 85% RH, and then left standing for 6 hours or more. Subsequently, an image having a 14 point-size alphabetical character "E" printed with a coverage ratio of 1% to the area of an A4-size sheet (hereinafter, also referred to as a "character E image") was continuously output to 100 sheets of copying paper, a white solid image was then output to new sheets of copying paper, and the printer was stopped during output of the white solid image.

Here, for toners carried on portions having a narrow area, among portions between the development blade and the photoreceptor contact position, of the development sleeve, the frictional charge amount distribution was measured.

The frictional charge amount distribution was measured using E-spart Analyzer Model EST-III (manufactured by Hosokawa Micron Corporation).

The number of particles measured was about 3,000, and the standard deviation σ of the measured value was defined as a frictional charge amount distribution of the toner.

Criteria for evaluation of the frictional charge amount distribution of the toner are as follows.
Rank A: Very good frictional charge amount distribution (σ<3.0)
Rank B: Fairly good frictional charge amount distribution (3.0≤σ<4.0)
Rank C: Good frictional charge amount distribution (4.0≤σ<5.0)
Rank D: Poor frictional charge amount distribution (σ>5.0)

It is needless to say that the better the electro-conductive path is formed in the electro-conductive layer, the better the frictional charge amount distribution of the toner.

Image Evaluation on Electro-Conductive Blade

As a development blade, the electro-conductive blade was attached to an electrophotographic process cartridge (trade name: 37X Black Toner Cartridge, manufactured by Hewlett Packard Company). The process cartridge was attached to an electrophotographic image forming apparatus (trade name: HP LaserJet Enterprise M608dn, manufactured by Hewlett Packard Company) capable of treating A4-size sheets, so that electrophotographic images were formed. Here, the metal portion of the development sleeve was electrically connected to the metal plate of the development blade. Three electrophotographic images with a solid black image formed on an A4-size sheet were output, followed by outputting one electrophotographic image with a halftone image (image with one dot-width lines drawn at intervals of 2 dots in a direction perpendicular to the rotation direction of an electrophotographic photoreceptor) formed on an A4-size sheet. The electrophotographic images were output at a temperature of 15° C. and a relative humidity of 10%. The central portion of the image was visually observed, and occurrence of density unevenness, which may result from unevenness in electro-conductive points of the electro-conductive blade, and the degree thereof were evaluated on the basis of the following criteria.
Rank A: There is no density unevenness.
Rank B: There is slight density unevenness.
Rank C: There is density unevenness.

Example 14

With respect to Example 13, the unvulcanized rubber mixture 4 obtained in Example 4 was used as an unvulcanized rubber mixture.

Except for the above, the same procedure as in Example 13 was carried out to prepare an electro-conductive blade, and various characteristics were evaluated.

The electric resistivity of the electro-conductive blade was $6.3 \times 10^5$ Ωcm.

Example 15

With respect to Example 13, the unvulcanized rubber mixture 8 obtained in Example 8 was used as an unvulcanized rubber mixture.

Except for the above, the same procedure as in Example 13 was carried out to prepare an electro-conductive blade, and various characteristics were evaluated.

The electric resistivity of the electro-conductive blade was $5.0 \times 10^5$ Ωcm.

Comparative Example 9

With respect to Example 13, the unvulcanized rubber mixture 9 obtained in Comparative Example 1 was used as an unvulcanized rubber mixture.

Except for the above, the same procedure as in Example 13 was carried out to prepare an electro-conductive blade, and various characteristics were evaluated.

The electric resistivity of the electro-conductive blade was $4.6 \times 10^5$ Ωcm.

Table 3 below shows the results of evaluation of uniformity of domains, the results of evaluation of variation in electro-conductive particles in domains, the results of evaluation of the shapes of domains, the results of evaluation of particle size distributions of domains, mixing apparatuses used, average domain sizes on cross-sections and the results of evaluation of electro-conductive blades in Examples 13 to 15 and Comparative Example 9.

TABLE 3

| | | | Evaluation of domains | | | | | | | | | | | |
|---|---|---|---|---|---|---|---|---|---|---|---|---|---|---|
| | | | Uniformity | | | | | | | | Variation in electro-conductive particles | | Domain shape | | Size distribution |
| | | | Number of unit cubes meeting condition (1) | | | | | | | | | | | Average | |
| | | Rank | 1 | 2 | 3 | 4 | 5 | 6 | 7 | 8 | 9 | Rank | σ/μ, μ(%) | Rank | circularity | Rank |
| Example | 13 | II | 27 | 26 | 26 | 21 | 27 | 26 | 25 | 25 | 27 | (ii) | 0.28, 22 | (c) | 2.10 | (3) |
| | 14 | I | 27 | 26 | 27 | 24 | 27 | 26 | 27 | 25 | 26 | (ii) | 0.27, 20 | (b) | 1.95 | (2) |
| | 15 | I | 27 | 27 | 27 | 27 | 27 | 27 | 27 | 27 | 27 | (i) | 0.05, 32 | (a) | 1.79 | (1) |

TABLE 3-continued

| | | | | | | | | | | | | | | |
|---|---|---|---|---|---|---|---|---|---|---|---|---|---|---|
| Comparative Example | 9 | V | 17 | 10 | 11 | 16 | 9 | 8 | 17 | 16 | 10 (iii) | 0.41, 18 | (d) | 2.50 | (4) |

| | | Evaluation of domains | | | Average domain size on cross-section (μm) | Evaluation of electro-conductive blade | | Frictional charge amount distribution of toner | Evaluation of image Concentration unevenness |
|---|---|---|---|---|---|---|---|---|---|
| | | Size distribution | | Mixing apparatus | | Electric resistance $\sigma_R/\mu_R$ | Current maintenance ratio | | |
| | | L2/L1 | L3/L1 | | | | | | |
| Example | 13 | 71 | 29 | Pressure-type kneader | 0.84 | B | C | C | C |
| | 14 | 81 | 19 | Elongational shear apparatus | 0.53 | B | C | C | B |
| | 15 | 100 | 0 | Continuous elongational shear apparatus | 0.33 | A | A | A | A |
| Comparative Example | 9 | 34 | 66 | Pressure-type kneader | 4.40 | D | D | D | D |

The results of evaluation of the electro-conductive member applied to a developing roller as an electro-conductive roller will be described below.

<Preparation of Developing Roller>

Example 16

(1. Production of Master Batch 16)

[1-1. Preparation of Master Batch 16]

Materials, the types and the amounts of which are shown in Table 4, were mixed by a pressure kneader to give a master batch 16.

TABLE 4

Raw materials of master batch 16

| | Name of raw material | Content (parts by mass) |
|---|---|---|
| Raw material rubber | NBR (trade name: Nipol Dn219 manufactured by Zeon Corporation) | 100 |
| Electro-conductive particle | Carbon black (trade name: TOKABLACK #5500 manufactured by TOKAI CARBON CO., LTD) | 50 |
| Vulcanization acceleration aid | Zinc Oxide (trade name: Zinc Oxide manufactured by Sakai Chemical Industry Co., Ltd.) | 5 |
| Processing aid | Zinc Stearate (trade name: SZ-2000 manufactured by Sakai Chemical Industry Co., Ltd.) | 2 |

[1-2. Preparation of Unvulcanized Rubber Composition]

Materials, the types and the amounts of which are shown in Table 5, were mixed by a pressure kneader to give an unvulcanized rubber composition.

TABLE 5

Raw material of unvulcanized rubber composition

| | Name of raw material | Content (parts by mass) |
|---|---|---|
| Raw material rubber | Master batch 16 | 30 |
| Raw material rubber | SBR (trade name: Nipol NS116 manufactured by Zeon Corporation) | 70 |
| Filler | Calcium carbonate (trade name: NANOX#30 manufactured by Maruo Calcium Co., Ltd.) | 10 |
| Vulcanization acceleration aid | Zinc oxide (trade name: Zinc Oxide manufactured by Sakai Chemical Industry Co., Ltd.) | 5 |
| Processing aid | Zinc Stearate (trade name: SZ-2000 manufactured by Sakai Chemical Industry Co., Ltd.) | 2 |

Materials, the types and the amounts of which are shown in Table 6, were mixed by an open roll to prepare an electro-conductive member forming rubber composition 16.

TABLE 6

Electro-conductive member molding rubber composition

| | Name of raw material | Content (parts by mass) |
|---|---|---|
| Raw material rubber | Unvulcanized rubber composition | 100 |
| Vulcanizing agent | Sulfur | 3 |
| Vulcanization aid | Tetrabenzylthiuram disulfide (trade name: TBZTD manufactured by Sanshin Chemical Industry Co., Ltd.) | 1 |

(2. Formation of Electro-Conductive Member)

[2-1. Electro-Conductive Shaft Core]

A core metal having an outer diameter of 6 mm and made of free-cutting steel with a surface subjected to electroless nickel plating was prepared. Next, using a roll coater, the core metal was coated with an adhesive: METALOC U-20 (manufactured by TOYOKAGAKU KENKYUSHO CO., LTD.) on the entire circumference except for both end portions of 15 mm. In this Example, the core metal coated with the adhesive was used as an electro-conductive shaft core.

Next, a die having an inner diameter of 16.0 mm was attached to the leading end of a crosshead extruder having an electro-conductive shaft core supply mechanism and an unvulcanized rubber roller discharge mechanism. The temperatures of the extruder and the crosshead were adjusted to 80° C., and the conveyance speed of the electro-conductive shaft core was adjusted to 60 mm/sec. Under the conditions, the unvulcanized rubber composition was supplied from the extruder, and the outer circumferential portion of the electro-conductive shaft core was covered with the unvulcanized rubber composition in the crosshead to give an unvulcanized rubber roller.

Next, the unvulcanized rubber roller was introduced into a hot-air vulcanization furnace at 170° C., and heated for 60 minutes to vulcanize the unvulcanized rubber composition, thereby obtaining a roller having an electro-conductive resin layer formed on the outer circumferential portion of an electro-conductive shaft core. Thereafter, the end portions of the electro-conductive resin layer were removed by cutting, and the surface of the electro-conductive resin layer was polished with a sharping wheel. In this way, a developing roller 100 was prepared which has a diameter of 12.0 mm at a position of 90 mm from the central portion toward each of both end portions and a diameter of 12.2 mm at the central portion.

Evaluation on the obtained electro-conductive roller was performed in the same manner as in Example 1 except for image quality evaluation. Here, evaluation of the frictional charge amount distribution of the toner and image evaluation on the developing roller (L/L ghost) as described below are added instead of the image quality evaluation in Example 1.

[Evaluation of Frictional Charge Amount Distribution of Toner]

For evaluating the extent of the frictional charge amount of the toner, the frictional charge amount distribution was measured.

The developing roller of each of Examples and Comparative Examples was loaded into a magenta toner cartridge for a laser printer (trade name: HP Color Laserjet Enterprise CP4515dn, manufactured by Hewlett Packard Company). Subsequently, the cartridge was loaded into the laser printer, placed in a high-temperature and high-humidity environment at an atmospheric temperature of 32° C. and a relative humidity of 85% RH (changed to a high-speed system), and then left standing for 6 hours or more. Subsequently, an image having a 14 point-size alphabetical character "E" printed with a coverage ratio of 1% to the area of an A4-size sheet (hereinafter, also referred to as a "character E image") was continuously output to a predetermined number of sheets of copying paper, a white solid image was then output to new sheets of copying paper, and the printer was stopped during output of the white solid image.

Here, for toners carried on portions having a narrow area, among portions between the toner regulating blade and the photoreceptor contact position, of the developing roller, the frictional charge amount distribution was measured.

The frictional charge amount distribution was measured using E-spart Analyzer Model EST-III (manufactured by Hosokawa Micron Corporation).

The number of particles measured was about 3,000. The standard deviation was calculated from the obtained frictional charge amount distribution. The standard deviation of a value measured after output of 100 sheets was defined as an initial frictional charge amount distribution of the toner, and the standard deviation of a value measured after output of 30,000 sheets was defined as a frictional charge amount distribution after endurance of the toner.

Criteria for evaluation of the frictional charge amount distribution of the toner are as follows.

Rank A: Very good frictional charge amount distribution ($\sigma<3.0$)
Rank B: Fairly good frictional charge amount distribution ($3.0 \leq \sigma < 4.0$)
Rank C: Good frictional charge amount distribution ($4.0 \leq \sigma < 5.0$)
Rank D: Poor frictional charge amount distribution ($\sigma > 5.0$)

It is needless to say that the better the electro-conductive path is formed in the electro-conductive layer, the better the frictional charge amount distribution of the toner.

Image Evaluation on Developing Roller (L/L Ghost)

The developing roller obtained in each of Examples and Comparative Examples was loaded into a process cartridge for a laser printer (trade name: LBP7700C, manufactured by Canon Inc.). The process cartridge was incorporated into the laser printer, so that electrophotographic images were formed. 7,000 electrophotographic images were output in which a 4 point-size alphabetical character "E" was drawn at a print density of 1% on an A4-size sheet.

Subsequently, ghost image evaluation was performed. That is, as an image pattern, a solid black image of 15 mm square was printed at leading end portions and a halftone image was then printed over the entire surface per sheet using a black toner. Next, density unevenness (ghost) of toner carrier cycle, which appeared on the halftone portion, was visually observed.

Criteria for evaluation on ghost are as follows.
Rank A: There is no ghost.
Rank B: There is a slight ghost.
Rank C: There is a ghost.
Rank D: There is a marked ghost.

Example 17

Except that the screw rotation speed in elongational shear processing during kneading of the unvulcanized rubber mixture 7 (A kneaded rubber composition) in Example 7 was changed to 850 rpm, the same procedure as in Example 7 was carried out to give a corresponding B kneaded rubber composition 17. Thereafter, an electro-conductive roller for evaluation of a developing roller was prepared in the same manner as in Example 16, and various characteristics were evaluated.

Example 18

Except that the screw rotation speed in elongational shear processing during kneading of the unvulcanized rubber mixture 8 (A kneaded rubber composition) in Example 8 was changed to 630 rpm, the same procedure as in Example 8 was carried out to give a corresponding B kneaded rubber composition 18. Thereafter, an electro-conductive roller for evaluation of a developing roller was prepared in the same manner as in Example 16, and various characteristics were evaluated.

Comparative Example 10

The same procedure as in Comparative Example 1 was carried out to give a corresponding B kneaded rubber composition. Thereafter, an electro-conductive roller for evaluation of a developing roller was prepared in the same manner as in Example 16, and various characteristics were evaluated.

Table 7 shows the results of evaluation of the electro-conductive member applied to a developing roller.

TABLE 7

| | | | Evaluation of domains | | | | | | | | | | | | |
|---|---|---|---|---|---|---|---|---|---|---|---|---|---|---|---|
| | | | Uniformity | | | | | | | | Variation in electro-conductive particles | | Domain shape | | Size distribution |
| | | | Number of unit cubes meeting condition (1) | | | | | | | | | | Average | | |
| | | Rank | 1 | 2 | 3 | 4 | 5 | 6 | 7 | 8 | 9 | Rank | σ/μ, μ(%) | Rank | circularity | Rank |
| Example | 16 | III | 21 | 24 | 25 | 23 | 25 | 27 | 19 | 23 | 22 | (ii) | 0.32, 21 | (c) | 2.31 | (3) |
| | 17 | I | 27 | 25 | 26 | 27 | 27 | 26 | 26 | 27 | 27 | (i) | 0.11, 31 | (a) | 1.82 | (2) |
| | 18 | I | 27 | 27 | 27 | 27 | 27 | 27 | 27 | 27 | 27 | (i) | 0.05, 32 | (a) | 1.79 | (1) |
| Comparative Example | 10 | V | 10 | 17 | 16 | 16 | 9 | 8 | 17 | 10 | 11 | (iii) | 0.41, 18 | (d) | 2.50 | (4) |

| | | Evaluation of domains Size distribution | Mixing apparatus | Average domain size on cross-section (μm) | Evaluation of electro-conductive roller | | Frictional charge amount distribution of toner | Evaluation of image Ghost |
|---|---|---|---|---|---|---|---|---|
| | | L2/L1 | L3/L1 | | | Electric resistance $\sigma_R/\mu_R$ | Current maintenance ratio | | |
| Example | 16 | 66 | 34 | Pressure-type kneader | 1.80 | C | C | C | C |
| | 17 | 93 | 7 | Elongational shear apparatus | 0.42 | A | B | B | B |
| | 18 | 100 | 0 | Continuous elongational shear apparatus | 0.30 | A | A | A | A |
| Comparative Example | 10 | 34 | 66 | Pressure-type kneader | 4.50 | D | D | D | D |

According to one aspect of the present disclosure, it is possible to obtain an electrophotographic electro-conductive member to be used in application of a low voltage, with which transfer of charge in an electro-conductive path is made extremely efficient, the electric resistivity is made less likely to change even in a high-speed process, and the electro-conductive path is made homogeneous to achieve suppression of discharge unevenness.

According to another aspect of the present disclosure, it is possible to obtain a process cartridge which contributes to formation of an electrophotographic image of high quality. According to still another aspect of the present disclosure, it is possible to obtain an electrophotographic image forming apparatus capable of forming an electrophotographic image of high quality.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrophotographic electro-conductive member comprising
an electro-conductive layer containing:
a matrix containing a crosslinked product of a first rubber; and
domains dispersed in the matrix,
each of the domains containing a crosslinked product of a second rubber and electro-conductive particles, the first rubber being different from the second rubber, wherein
when
an average of ratios of the cross-sectional area of the electro-conductive particles contained in each of the domains to the cross-sectional area of each of the domains appearing on a cross-section of the electro-conductive layer in a thickness direction is defined as μ, and
a standard deviation of the ratios is defined as σ,
σ/μ is 0 or more and 0.4 or less,
μ is 20% or more and 40% or less, and wherein among first cubic shaped samples each having 9 μm on a side sampled at arbitrary nine portions from the electro-conductive layer, at least eight of the samples satisfy the following condition (1):
Condition (1)
assuming that one sample is divided into 27 unit cubes having 3 μm on a side, and a volume Vd of the domains contained in each of the unit cubes is calculated, a number of the unit cubes having Vd of 2.7 to 10.8 μm³ is at least 20.

2. The electrophotographic electro-conductive member according to claim 1, wherein σ/μ is 0 or more and 0.25 or less.

3. The electrophotographic electro-conductive member according to claim 1, wherein the number ratio of domains having a circularity of 1 or more and less than 2 to the domains appearing on the cross-section of the electro-conductive layer in the thickness direction is 70% or more.

4. The electrophotographic electro-conductive member according to claim 1, wherein
when
the total number of the domains appearing on a cross-section of the electro-conductive layer in a thickness direction is defined as L1, the number of domains having an area of $3.0 \times 10^4$ nm$^2$ or more and less than $1.2 \times 10^5$ nm$^2$ as measured on the cross-section among the domains appearing on a cross-section of the electro-conductive layer in a thickness direction, is defined as L2, and the number of domains having an area of $1.2 \times 10^5$ nm$^2$ or more as measured on the cross-section among the domains appearing on a cross-section of the electro-conductive layer in a thickness direction, is defined as L3, L1, L2 and L3 meet the following relational expressions (1) and (2):

$80 \leq 100 \times L2/L1 \leq 100$; and        Relational expression (1)

$0 \leq 100 \times L3/L1 \leq 20$ or less.        Relational expression (2)

5. The electrophotographic electro-conductive member according to claim 1,
wherein the electrophotographic electro-conductive member is a charging roller or a transfer roller, and includes a columnar or cylindrical electro-conductive substrate, and the electro-conductive layer on an outer circumferential surface of the substrate.

6. The electrophotographic electro-conductive member according to claim 1,
wherein the electrophotographic electro-conductive member is an electro-conductive blade, and includes a metal plate, and the electro-conductive layer covering a surface of at least a part of the metal plate.

7. The electrophotographic electro-conductive member according to claim 1,
wherein the electrophotographic electro-conductive member is a developing roller, and includes a columnar or cylindrical electro-conductive substrate, and the electro-conductive layer on the outer circumferential surface of the substrate.

8. A method for producing the electrophotographic electro-conductive member comprising an electro-conductive layer containing:

a matrix containing a crosslinked product of a first rubber; and domains dispersed in the matrix, each of the domains containing a crosslinked product of a second rubber and electro-conductive particles, the first rubber being different from the second rubber, wherein when an average of ratios of the cross-sectional area of the electro-conductive particles contained in each of the domains to the cross-sectional area of each of the domains appearing on a cross-section of the electro-conductive layer in a thickness direction is defined as $\mu$, and a standard deviation of the ratios is defined as $\sigma$, $\sigma/\mu$ is 0 or more and 0.4 or less, $\mu$ is 20% or more and 40% or less, and wherein among first cubic shaped samples each having 9 μm on a side sampled at arbitrary nine portions from the electro-conductive layer, at least eight of the samples satisfy the following condition (1):

Condition (1)

assuming that one sample is divided into 27 unit cubes having 3 μm on a side, and a volume Vd of the domains contained in each of the unit cubes is calculated, a number of the unit cubes having Vd of 2.7 to 10.8 μm$^3$ is at least 20, the method comprising the steps of:

(1) kneading an unvulcanized rubber mixture containing a first unvulcanized rubber as a raw material of the first rubber, a second unvulcanized rubber as a raw material of the second rubber and the electro-conductive particles by using a kneader including an elongational shear screw to prepare an unvulcanized rubber kneaded product;

(2) forming a layer of the unvulcanized rubber kneaded product on an outer surface of the electro-conductive substrate; and (3) vulcanizing the first unvulcanized rubber and the second unvulcanized rubber in the layer of the unvulcanized rubber kneaded product to prepare the electro-conductive layer.

* * * * *